(12) United States Patent
Wei et al.

(10) Patent No.: US 11,586,479 B2
(45) Date of Patent: Feb. 21, 2023

(54) LOAD BALANCING OF COMPUTING SESSIONS WITH LOAD PATTERNS

(71) Applicant: Citrix Systems, Inc., Fort Lauderdale, FL (US)

(72) Inventors: Daowen Wei, Nanjing (CN); Hengbo Wang, Nanjing (CN); Jian Ding, Nanjing (CN); Feng Tao, Nanjing (CN)

(*) Notice: Subject to any disclaimer, the term of this patent is extended or adjusted under 35 U.S.C. 154(b) by 176 days.

(21) Appl. No.: 16/899,098

(22) Filed: Jun. 11, 2020

(65) Prior Publication Data
US 2021/0373967 A1 Dec. 2, 2021

Related U.S. Application Data

(63) Continuation of application No. PCT/CN2020/092551, filed on May 27, 2020.

(51) Int. Cl.
*G06F 15/173* (2006.01)
*G06F 9/50* (2006.01)
*H04L 67/148* (2022.01)

(52) U.S. Cl.
CPC .......... *G06F 9/5083* (2013.01); *H04L 67/148* (2013.01)

(58) Field of Classification Search
CPC combination set(s) only.
See application file for complete search history.

(56) References Cited

U.S. PATENT DOCUMENTS

2019/0140912 A1* 5/2019 He ................... H04L 43/0876
2019/0334822 A1* 10/2019 Larumbe ............... H04L 47/127

FOREIGN PATENT DOCUMENTS

| CN | 108632384 A | 10/2018 |
| CN | 110413657 A | 11/2019 |

OTHER PUBLICATIONS

International Search Report on PCT Appl. No. PCT/CN2020/092551 dated Feb. 20, 2021.

* cited by examiner

*Primary Examiner* — Thanh T Nguyen

(57) ABSTRACT

Described embodiments provide systems and methods for balancing user sessions using load pattern forecasting are provided here. A device can determine a pattern of load distribution for a session prior to establishment of the session on a server of a computing environment. The pattern can be indicative of load on a server to run the session for a range of time. The device can determine an amount of usage of the plurality of servers on a per server basis. The usage can be indicative of sessions to be run on individual servers for the range of time. The device can select one of the plurality of servers on which to run the session based on a comparison of the pattern of load distribution for the session and the determined amounts of usage of the plurality servers. The device can assign the session to the selected server of the computing environment to balance resource usage across the computing environment.

20 Claims, 6 Drawing Sheets

LOAD BALANCING OF COMPUTING SESSIONS WITH LOAD PATTERNS

CROSS-REFERENCE TO RELATED APPLICATION

This application is a continuation of and claims priority to and the benefit of International Patent Application No. PCT/CN2020/092551, titled "LOAD BALANCING OF COMPUTING SESSIONS WITH LOAD PATTERNS," and filed on May 27, 2020, the contents of all of which are hereby incorporated herein by reference in its entirety for all purposes.

BACKGROUND

In network environments, a server can host or provide access to a plurality of resources or applications for a plurality of users. For example, a user can establish a session to particular application or resource through the server. The resources or applications can include third party resources or applications provided by one or more third party servers. The server can establish one or more connections to the third party servers to provide the access to the plurality of resources and applications for the plurality of users.

SUMMARY

Systems and methods for load balancing of computer sessions with load patterns are provided herein. In embodiments, a device intermediary to a plurality of client devices and a plurality of servers can balance user sessions across a plurality of servers by matching a forecasted pattern of load distribution of the user session with a forecasted pattern of load distribution of at least one server. The forecasted pattern of load distribution or accumulated distribution pattern for the server can include load of existing sessions on the server. The server can be selected to host the user session using future load distribution patterns forecasted for the user session, a current load index of each of the servers, and load of existing sessions on the servers to maximize resource utilization within a computing environment.

For example, the device can determine or predict a pattern of load distribution for the user session based in part on one or more previous sessions over a specified sampling interval (e.g., multiple days, multiple weeks). The device can determine an accumulated load pattern for servers based in part on forecasted patterns of load distribution for existing or active sessions on the respective servers. The accumulated distribution pattern for a server can include a summed total of the forecasted patterns of load distribution for existing or active sessions on the respective server. The properties of the pattern of load distribution for the user session and the accumulated load pattern of the servers can be matched, compared or analyzed to identify at least one complementary server to host the user session. The complementary server can be selected based in part on a total session load 230 forecasted for the server and indicative of if the server hosted the user session (e.g., predicted values) and using one or more threshold or tolerance values. The device can balance user sessions across the plurality of servers by forecasting or predicting load patterns for the individual user sessions and accumulated load patterns for the servers to avoid or reduce overload conditions, performance issues and/or imbalanced load distributions in a computing environment (e.g., network, cloud computing environment) and provide increased resource utilization and better user experience.

In at least one aspect, a method implemented by a computing device is provided. The method can include determining a pattern of load distribution for a session prior to establishment of the session on a server of a computing environment. The pattern can be indicative of load on a server to run the session for a range of time, and the computing environment can include a plurality of servers on which to establish the session. The method can include determining an amount of usage of the plurality of servers on a per server basis. The usage can be indicative of sessions to be run on individual servers of the computing environment for the range of time. The method can include selecting one of the plurality of servers on which to run the session based on a comparison of the pattern of load distribution for the session and the determined amounts of usage of the plurality servers. The method can include assigning the session to the selected server of the computing environment to balance resource usage across the computing environment.

In embodiments, the method can include determining a total value of patterns of load distribution for a plurality of sessions of the selected server. The method can include determining a correlation coefficient of the selected server is less than a threshold value. The correlation coefficient can be indicative of a relationship between the pattern of load distribution for the session and a total value of patterns of load distribution for a plurality of sessions of the selected server. The method can include determining a plurality of load index values for one or more previous sessions over a determined interval and determining the pattern of load distribution for the session using the plurality of load index values.

In some embodiments, the method can include determining a plurality of load index values for individual sessions active on the plurality of servers and determining, using the plurality of load index values, the pattern of load distribution for individual sessions active on the plurality of servers. The method can include determining a covariance between the pattern of load distribution for the session and the usage for at least one server for the range of time. The method can include determining, using the covariance, the correlation coefficient between the pattern of load distribution for the session and the usage for the plurality of servers.

The method can include identifying multiple servers from the plurality of servers having a correlation coefficient less than a threshold value. The method can include determining a total load for at least one server, the total load including the pattern of load distribution pattern for the session combined with the usage for the at least one server. The method can include identifying a subset of servers from the multiple servers with total loads less than a load threshold value. The subset of servers can include the selected server. The method can include assigning the session to the selected server responsive to the total load of the selected server being less than the load threshold value.

In at least one aspect, a method implemented by a computing device is provided. The method can include determining a load index value for at least one session active on a server. The load index value can be indicative of a point within a window for the at least one session. The window can be a period of time in which to identify usage of the server. The method can include determining a load distribution pattern for the at least one session based on the determined load index value. The method can include generating an accumulated distribution pattern for the server.

The accumulated distribution pattern can be indicative of a predicted load pattern for the server. The method can include assigning a new session to the server based on the generated accumulated distribution pattern for the server to establish the session on the server.

In embodiments, the method can include applying a moving average filter to the load index value for at least one session to generate the load distribution pattern of the at least one session. The value in a load distribution pattern can be indicative of a moving average between the load index value and one or more previous load index values. The method can include applying a weighted coefficient to the moving average filter. The weighted coefficient can represent a bias correction for an initial period for the respective session. The method can include combining the load distribution patterns of the one or more sessions to generate the accumulated distribution pattern of the server for a determined time period. The accumulated distribution pattern can include a plurality of predicted load index values for the server over the determined time period.

In at least one aspect, a system is provided. The system can include one or more processors coupled to memory. The one or more processors can be configured to determine a pattern of load distribution for a session prior to establishment of the session on a server of a computing environment. The pattern can be indicative of load on a server to run the session for a range of time. The computing environment can include a plurality of servers on which to establish the session. The one or more processors can be configured to determine an amount of usage of the plurality of servers on a per server basis. The usage can be indicative of sessions to be run on individual servers of the computing environment for the range of time. The one or more processors can be configured to select one of the plurality of servers on which to run the session based on a comparison of the pattern of load distribution for the session and the determined amounts of usage of the plurality servers. The one or more processors can be configured to assign the session to the selected server of the computing environment to balance resource usage across the computing environment.

In embodiments, the one or more processors can be configured to determine a total value of patterns of load distribution for a plurality of sessions of the server. The one or more processors can be configured to determine a correlation coefficient of the selected server is less than a threshold value. The correlation coefficient can be indicative of a relationship between the pattern of load distribution for the selected session and a total value of patterns of load distribution for a plurality of sessions of the server. The one or more processors can be configured to determine a plurality of load index values for one or more previous sessions over a determined interval and determine the pattern of load distribution for the session using the plurality of load index values.

In some embodiments, the one or more processors can be configured to determine a covariance between the pattern load distribution for the session and the usage for at least one server for the range of time. The one or more processors can be configured to determine, using the covariance, the correlation coefficient between the pattern of load distribution for the session and the usage for the plurality of servers.

The details of various embodiments of the disclosure are set forth in the accompanying drawings and the description below.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

Figure 1A:
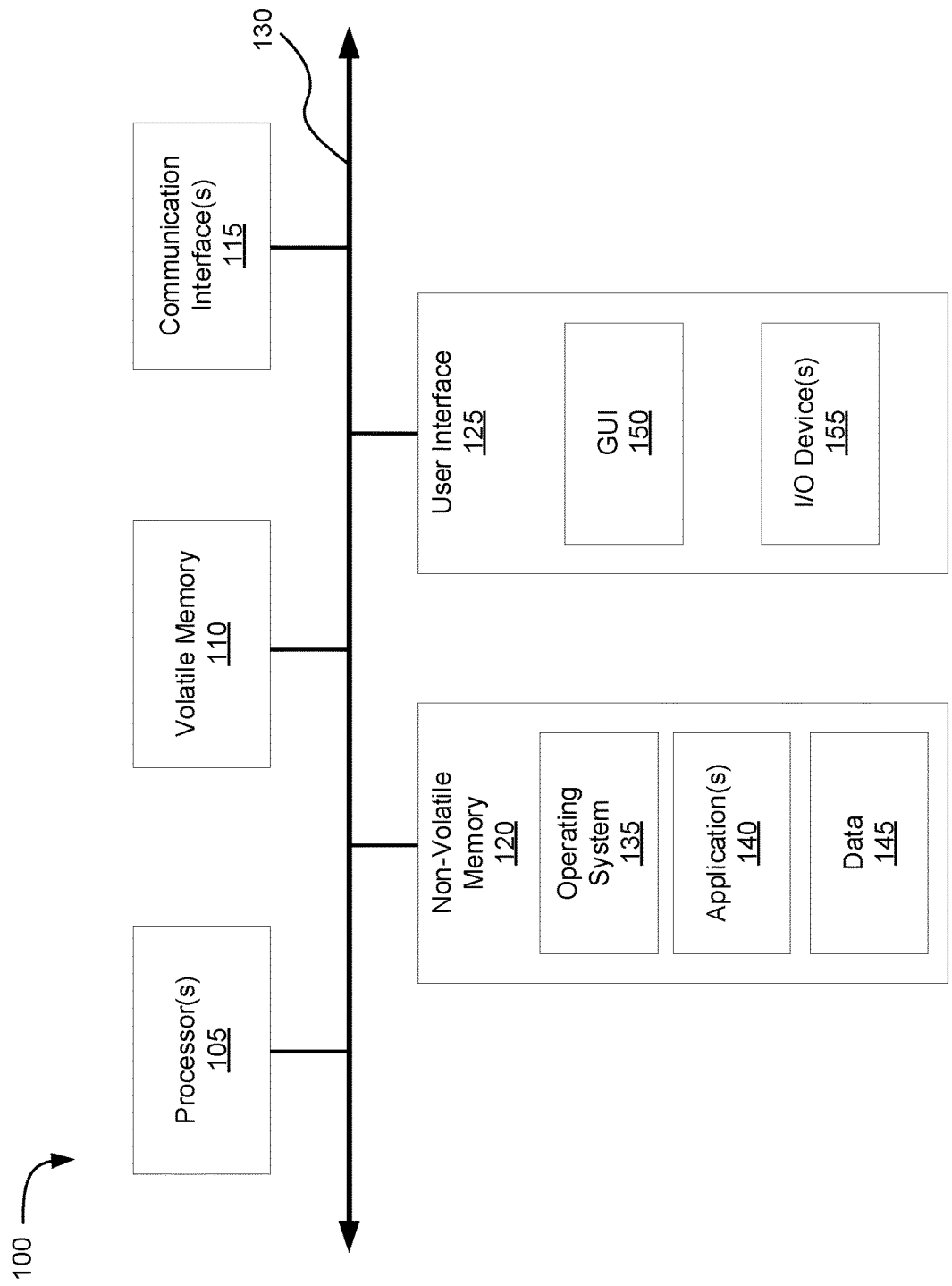
FIG. 1A is a block diagram of embodiments of a computing device.

Systems and methods for balancing user sessions across a plurality of servers using load pattern forecasting are provided herein. A device can balance or match user sessions with servers in a computing environment by predicting or forecasting a load pattern for a new user sessions and predicting or forecasting load patterns for existing sessions of the plurality of servers on a per server basis. The device can forecast a pattern of load distribution for a new session for a particular range of time, for example, using previous user sessions. The device can forecast an accumulated load distribution and a total load value for a server. The accumulated load distribution can include the patterns of load distribution of existing sessions on the respective server and the total load value can include a combined load value representing the forecasted load for the new session and the forecasted load for the respective server. The new session can be assigned or matched to at least one server based in part on the forecasted loads to reduce or minimize overload conditions, avoid performance degradation and/or maximize resource utilization for the range of time.

A session can be requested to a resource or application provided by at least one server. The sessions (e.g., virtual app sessions) can be collocated in a server using, for example, load balancing techniques. The load balancing techniques can determine a load index for servers in a server farm or in a computing environment to which the requested application or resource is provided or hosted. The session can then be assigned to a server with the lowest load index for the desired application or resource. The load balancing techniques can detect a load index of a server at the session request or launch time and assign the new session to the server having the lowest or lightest load at the launch time or current time. However, the load on the server can change over time or during a particular range of time such that the load index at the session launch time provides an inaccurate view of the true load on the respective server during the range of time (e.g., during one or more user sessions to the server). For example, the load on the server can increase substantially at one or more points during the range of time and assigning the new session to the respective server may result in an overload condition, server performance issues and reduced user experience.

The different sessions may collocate in harmony at session launch time, but compete for resources at a later time during the respective sessions when respective users or client devices initiate or open more applications and increase the load on the respective server. The users that connect to or are assigned to the same servers can experience or suffer performance issues (e.g., response slowdown, failure) and result one some users disconnecting or logging off to request a new session and relaunch for manual rebalance across the servers. Thus, while some servers experience overload conditions, other servers may be underutilized or have minimal load. For example, the load balancing techniques may ignore or reject servers that experience a short spike in load at the session load time but may have minimal load for the remainder of the range of time. This can result in lower resource utilization for that server if the now new session is assigned after the session launch time.

The load balancing techniques may not account for future load changes and instead consider the current load view across the servers in the computing environment. For example, a first server can have a low initial load as indicated by a low load index value at a session launch time and an increasing load as indicated by the load index value during the course of a range of time (e.g., during a single day) and a second server can have a high initial load as indicated by a high load index value at a session launch time but a decreasing load as indicated by a lower load index value during the course of the range of time. If load on the first server increases during the course of the day and the increase in load matches or follows the increases in load of the new session over the same range of time, the first server can become overloaded or unbalanced as both load patterns increase. The load on the first server may exceed an upper limit resulting in performance issues and reduced user experience. However, if the session had been assigned to the second server, the load on that server may have stayed less than or below the upper limit resulting in a better user experience.

Systems and methods provided herein can predict or otherwise forecast patterns of load distribution for a new session and for existing sessions on a server to appropriately match a new session to a server using the forecasted load values for the new session and respective server during a particular range of time. In embodiments, a device can use a current load index of a server, future load change of a new session and future load change of a server to assign the new session to the server and balance complementary sessions by load distribution pattern in a collocation server. The device can forecast load patterns for a new session or existing sessions on a server using, for example, by machine learning techniques using data samples. The session can be matched to a server based in part on a covariance and correlation coefficient determined between the forecasted load pattern for the new session and a forecasted usage (e.g., accumulated load distribution) of existing sessions for the respective server. The device can increase or maximize resource utilization and avoid or reduce overload conditions during the range of time. The load balancing discussed herein can be used to balance sessions across a plurality of servers of a computing environment for increased resource utilization and better user experience.

Section A describes a computing environment which may be useful for practicing embodiments described herein; and Section B describes methods and systems for balancing user sessions across a plurality of servers using load pattern forecasting.

A. Computing Environment

Prior to discussing the specifics of embodiments of the systems and methods of for securing offline data (e.g., browser offline data) for shared accounts, it may be helpful to discuss the computing environments in which such embodiments may be deployed.

As shown in FIG. 1A, computer 100 may include one or more processors 105, volatile memory 110 (e.g., random access memory (RAM)), non-volatile memory 120 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 125, one or more communications interfaces 115, and communication bus 130. User interface 125 may include graphical user interface (GUI) 150 (e.g., a touchscreen, a display, etc.) and one or more input/output (I/O) devices 155 (e.g., a mouse, a keyboard, a microphone, one or more speakers, one or more cameras, one or more biometric scanners, one or more environmental sensors, one or more accelerometers, etc.). Non-volatile memory 120 stores operating system 135, one or more applications 140, and data 145 such that, for example, computer instructions of operating system 135 and/or applications 140 are executed by processor(s) 105 out of volatile memory 110. In some embodiments, volatile memory 110 may include one or more types of RAM and/or a cache memory that may offer a faster response time than a main memory. Data may be entered using an input device of GUI 150 or received from I/O device(s) 155. Various elements of computer 100 may communicate via one or more communication buses, shown as communication bus 130.

Computer 100 as shown in FIG. 1A is shown merely as an example, as clients, servers, intermediary and other networking devices and may be implemented by any computing or processing environment and with any type of machine or set of machines that may have suitable hardware and/or software capable of operating as described herein. Processor(s) 105 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 115 may include one or more interfaces to enable computer 100 to access a computer network such as a Local Area Network (LAN), a Wide Area Network (WAN), a Personal Area Network (PAN), or the Internet through a variety of wired and/or wireless or cellular connections.

In described embodiments, the computing device 100 may execute an application on behalf of a user of a client computing device. For example, the computing device 100 may execute a virtual machine, which provides an execution session within which applications execute on behalf of a user or a client computing device, such as a hosted desktop session. The computing device 100 may also execute a terminal services session to provide a hosted desktop environment. The computing device 100 may provide access to a computing environment including one or more of: one or more applications, one or more desktop applications, and one or more desktop sessions in which one or more applications may execute.

Figure 1B:
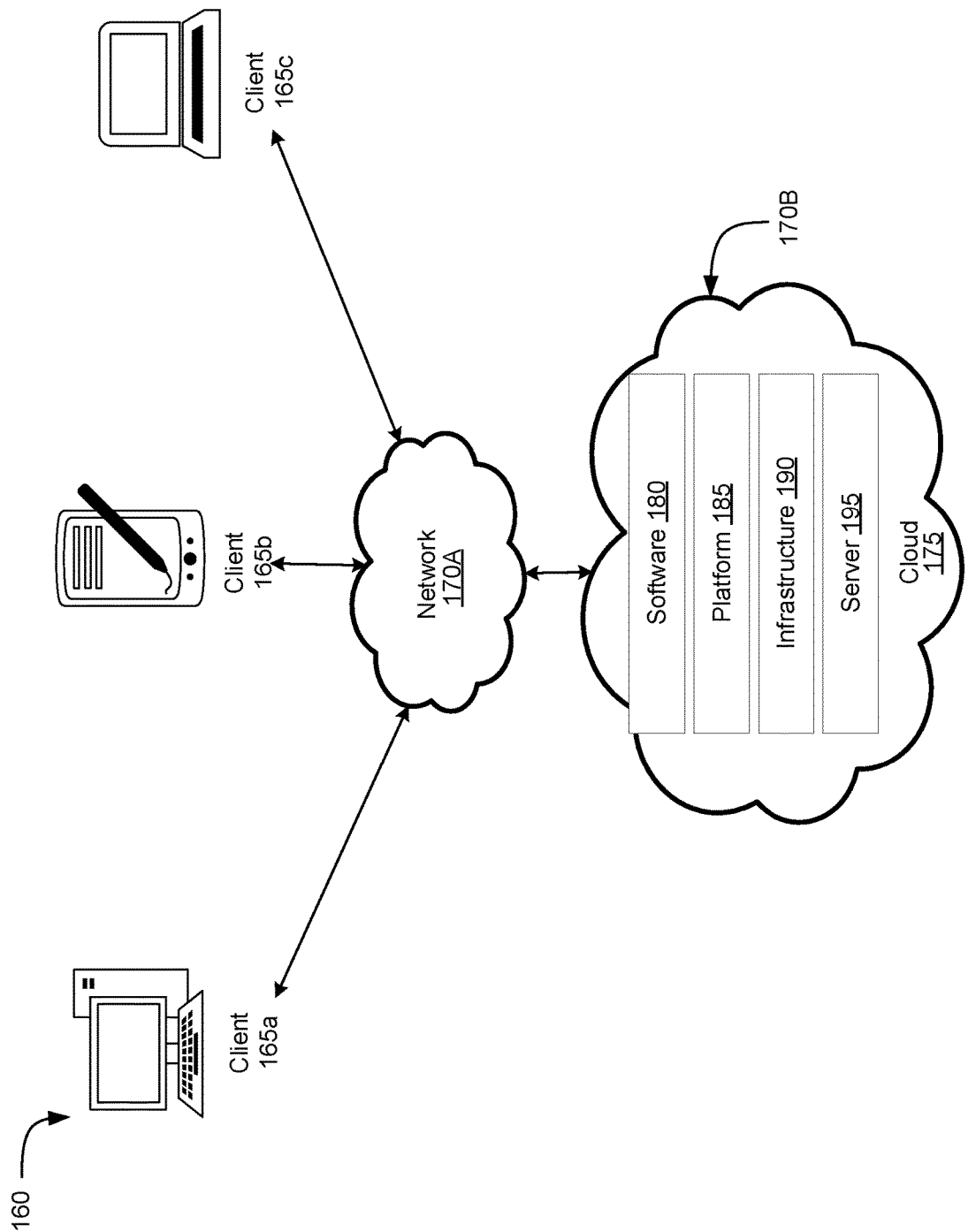
FIG. 1B is a block diagram depicting a computing environment comprising client device in communication with cloud service providers.

Referring to FIG. 1B, a computing environment 160 is depicted. Computing environment 160 may generally be considered implemented as a cloud computing environment, an on-premises ("on-prem") computing environment, or a hybrid computing environment including one or more on-prem computing environments and one or more cloud computing environments. When implemented as a cloud computing environment, also referred as a cloud environment, cloud computing or cloud network, computing environment 160 can provide the delivery of shared services (e.g., computer services) and shared resources (e.g., computer resources) to multiple users. For example, the computing environment 160 can include an environment or system for providing or delivering access to a plurality of shared services and resources to a plurality of users through the internet. The shared resources and services can include, but not limited to, networks, network bandwidth, servers 195, processing, memory, storage, applications, virtual machines, databases, software, hardware, analytics, and intelligence.

In embodiments, the computing environment 160 may provide client 165 with one or more resources provided by a network environment. The computing environment 160 may include one or more clients 165a-165n, in communication with a cloud 175 over one or more networks 170A, 170B. Clients 165 may include, e.g., thick clients, thin clients, and zero clients. The cloud 175 may include back end platforms, e.g., servers 195, storage, server farms or data centers. The clients 165 can be the same as or substantially similar to computer 100 of FIG. 1A.

The users or clients 165 can correspond to a single organization or multiple organizations. For example, the computing environment 160 can include a private cloud serving a single organization (e.g., enterprise cloud). The computing environment 160 can include a community cloud or public cloud serving multiple organizations. In embodiments, the computing environment 160 can include a hybrid cloud that is a combination of a public cloud and a private cloud. For example, the cloud 175 may be public, private, or hybrid. Public clouds 175 may include public servers 195 that are maintained by third parties to the clients 165 or the owners of the clients 165. The servers 195 may be located off-site in remote geographical locations as disclosed above or otherwise. Public clouds 175 may be connected to the servers 195 over a public network 170. Private clouds 175 may include private servers 195 that are physically maintained by clients 165 or owners of clients 165. Private clouds 175 may be connected to the servers 195 over a private network 170. Hybrid clouds 175 may include both the private and public networks 170A, 170B and servers 195.

The cloud 175 may include back end platforms, e.g., servers 195, storage, server farms or data centers. For example, the cloud 175 can include or correspond to a server 195 or system remote from one or more clients 165 to provide third party control over a pool of shared services and resources. The computing environment 160 can provide resource pooling to serve multiple users via clients 165 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In embodiments, the computing environment 160 can provide on-demand self-service to unilaterally provision computing capabilities (e.g., server time, network storage) across a network for multiple clients 165. The computing environment 160 can provide an elasticity to dynamically scale out or scale in responsive to different demands from one or more clients 165. In some embodiments, the computing environment 160 can include or provide monitoring services to monitor, control and/or generate reports corresponding to the provided shared services and resources.

In some embodiments, the computing environment 160 can include and provide different types of cloud computing services. For example, the computing environment 160 can include Infrastructure as a service (IaaS). The computing environment 160 can include Platform as a service (PaaS). The computing environment 160 can include server-less computing. The computing environment 160 can include Software as a service (SaaS). For example, the cloud 175 may also include a cloud based delivery, e.g. Software as a Service (SaaS) 180, Platform as a Service (PaaS) 185, and Infrastructure as a Service (IaaS) 190. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 165 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 165 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 165 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 165 may also access SaaS resources through smartphone or tablet applications, including, e.g., Salesforce Sales Cloud, or Google Drive app. Clients 165 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

B. Balancing User Sessions Across a Plurality of Servers Using Load Pattern Forecasting Systems and methods for balancing user sessions across a plurality of servers using load pattern forecasting are provided herein. A device can balance or match user sessions with servers in a computing environment by predicting or forecasting a load pattern for a new user sessions and predicting or forecasting load patterns for existing sessions of the plurality of servers on a per server basis. For example, the device can determine a pattern of load distribution for a session prior to establishment of the session on a server of a computing environment. The device can forecast or predict the pattern of load distribution for the new session for a particular range of time, for example, using previous user sessions. The device can forecast an accumulated load distribution for the servers and a total load value. The accumulated load distribution can include or correspond to an amount of usage for individual servers of the plurality of servers. The accumulated load distribution can include the patterns of load distribution of existing sessions on the respective server and the total load value can include a combined load value representing the forecasted load for the new session and the forecasted load for the respective server. The device can assign the new session to a server based in part on the forecasted loads to reduce or minimize overload conditions, avoid performance degradation and/or maximize resource utilization for the range of time. An overload condition can include or correspond to a time period or time point when a total resource usage (e.g., CPU utilization, memory usage) and/or demand on a server exceeds a load threshold and can result in the performance degradation (e.g., reduced response times) of the server as the server responds to the increased demand. The device can assign the session to the selected server of the computing environment to balance resource usage across the computing environment.

Figure 2:
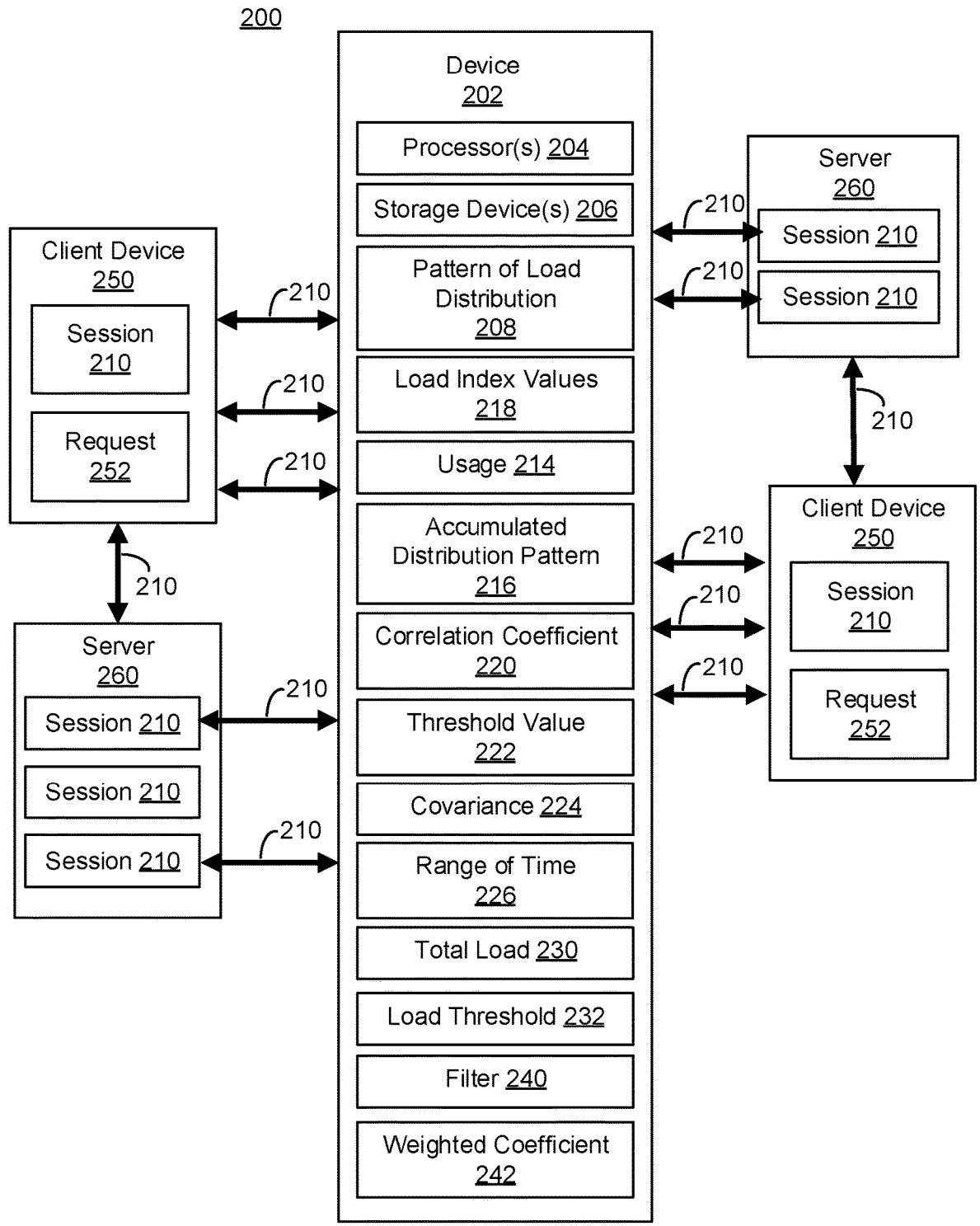
FIG. 2 is a block diagram of a system for balancing user sessions using load pattern forecasting.

Referring to FIG. 2, depicted is a block diagram of one embodiment of a computing environment 200 having a device 202 to balance sessions 210 for a plurality of servers 260 on a per server basis. The computing environment 200 (e.g., server farm, private network, public cloud) can include the plurality of servers 260 to establish sessions 210 to client devices 250 and provide access to resources or applications of the respective servers 260. For example, the device 202 can receive a request 252 for a session 210 from a client device 250 to at least one server 260. The device 202 can forecast a pattern of load distribution for the new session 210 and forecast load patterns of existing sessions 210 on the servers 260 to select at least one server 260 to assign to the new session 210. The server 260 can be selected to balance load across the plurality of servers 260, increase or maximize resource utilization across the computing environment 200 and increase a user experience of users of the respective client devices 250. In embodiments, the computing environment 200 can be the same as or substantially similar to the computing environment 160 of FIG. B.

The device 202 can be implemented using hardware or a combination of software and hardware. For example, components of the device 202 can include logical circuity (e.g., a central processing unit or CPU) that responses to and processes instructions fetched from a memory unit (e.g., storage device 206). Components of the device 202 can include or use a microprocessor or a multi-core processor. A multi-core processor can include two or more processing units (e.g., processor 204) on a single computing component. Components of the device 202 can be based on any of these processors, or any other processor capable of operating as described herein. Processors can utilize instruction level parallelism, thread level parallelism, different levels of cache, etc. For example, the device 202 can include at least one logic device such as a computing device or server having at least one processor 204 to communicate with one or more client devices 250. The components and elements of the device 202 can be separate components or a single component. The device 202 can include a memory component (e.g., storage device 206) to store and retrieve data (e.g., patterns of load distribution 208, load index values 218, usage values 214, accumulated distribution patterns 216, covariance values 224, correlation coefficients 220, total load values 230). The memory can include a random access memory (RAM) or other dynamic storage device, coupled with the storage device 206 for storing information, and instructions to be executed by the device 202. The memory can include at least one read only memory (ROM) or other static storage device coupled with the storage device 206 for storing static information and instructions for the device 202. The memory can include a storage device 206, such as a solid state device, magnetic disk or optical disk, to persistently store information and instructions. The device 202 can be the same as or substantially similar to computer 100 of FIG. 1A.

The device 202 can include a processor 204. The processor 204 can include non-volatile memory that stores computer instructions and an operating system. For example, the computer instructions can be executed by the processor 204 out of volatile memory to perform all or part of the method 300, method 340 and/or method 360. In some embodiments, the device 202 can include a non-transitory computer-readable medium, comprising instructions that, when executed by the processor 204 of the device 202, cause the processor 204 to perform all or part of the method 300, method 340 and/or method 360. The processor 204 can include a database and be configured to generate and/or store values including, but not limited to, patterns of load distribution 208, load index values 218, usage values 214, accumulated distribution patterns 216, covariance values 224, correlation coefficients 220, and total load values 230. The processor 204 can include non-volatile memory that stores computer instructions and an operating system. For example, the computer instructions can be executed by the processor 204 out of volatile memory to perform all or part of the method 300, method 340 and/or method 360. The device 202 can include a non-transitory computer-readable medium that includes instructions that, when executed by the processor 204 of the device 202 cause the processor 204 to execute or perform the functionalities of the method 300, method 340 and/or method 360.

The device 202 can determine patterns of load distribution 208 for one or more sessions 210. A pattern of load distribution 208 can include or represent a forecasted pattern of load for a session 210 over a range of time 226 (e.g., predicted load during a single day). For example, the pattern of load distribution 208 can be indicative of load on a server 260 to run the session 210 for the range of time 226. The pattern of load distribution 208 can be determined using one or more load index values 218. The load index values 218 can include or correspond to data points indicative of a load for the session at the respective data point during the range of time 226 (e.g., load at a first hour or first interval of the range of time). For example, a pattern of load distribution 208 can include or be generated using a plurality of load index values 218 with load index values 218 corresponding to individual data points during a specified range of time 226. In one embodiment, the range of time 226 can include a 24 hour day and the individual load index values 218 can include load values for the session 210 at given hours during the 24 hour range of time 226. The device 202 can determine load index values 218 for one or more sessions 210 (e.g., previous or existing sessions) to forecast a pattern of load distribution 208 for a new session. The sessions 210 can include one or more sessions 210 from the same client device 250, the same user, a similar user type (e.g., same job level, same security clearance) or a combination of one or more sessions 210 from the same client device 250, the same user, and a similar user type.

The range of time 226 can represent a time range in which a new session 210 or future session 210 may be active on a server 260. The range of time 226 can include, but not limited to, a day, multiple days, a few weeks or a few months. The device 202 can select the range of time 226 based in part on properties of the session 210 to be forecasted, the client device 250 and/or one or more servers 260. In some embodiments, the range of time 226 can be selected to include a time period from a start time for a new session 210 and an end time for the new session 210. For example, the start time or beginning of the range of time 226 can be selected to correspond to the session launch time (e.g., when session 210 is activated or initiated). The end time or the end of the range of time 226 can be selected to correspond to a first sampling point or load index value 218 having a zero value (e.g., no load, when forecasted load for session drops to zero) for the forecasted pattern of load distribution 208 of the respective session 210.

The device 202 can determine an amount of usage 214 for a server 260. The amount of usage 214 or usage 214 can be indicative of a forecasted accumulated load pattern or forecasted total load pattern of sessions 210 (e.g., existing sessions, active sessions) to be run on an individual server 260 during a range of time 226. In embodiments, the usage 214 of a server 260 can include or correspond to a summation or combination of patterns of load distribution for active, current or existing sessions 210 on the respective server 260. The device 202 can execute a usage equation (e.g., equation 4 described below with respect to (308) of method 300 of FIG. 3A) to determine the usage 214 for an individual server 260. The usage equation can sum or combine patterns of load distribution for active, current or existing sessions 210 on the respective server 260 for a specified range of time 226 to forecast the load on the server 260 for the range of time 226.

The device 202 can determine an accumulated distribution pattern 216 for the server 260. The device 202 can sum or combine the patterns of load distribution 208 for the existing or active sessions 210 of the server 260 to generate the accumulated distribution pattern 216 for the server 260 for a specified range of time 226. In some embodiments, the usage 214 of a server 260 can be the same as or correspond to the accumulated distribution pattern 216 of the same server 260.

The device 202 can determine a covariance 224 between a pattern of load distribution 208 for a session 210 (e.g., new session, session not yet assigned to a server) and the usage 214 of at least one server 260 for a range of time 226. The covariance 224 can include or represent a measure of variability or difference between the pattern of load distribution 208 for the session 210 and the usage 214 of the server 260 for the range of time 226. In embodiments, the device 202 can determine the covariance 224 between a pattern of load distribution 208 for a session 210 and the usage 214 or accumulated distribution pattern 216 of at least one server 260 for a range of time 226 using the methods and equations described below with respect to (310) of method 300 of FIG. 3A.

The device 202 can determine a correlation coefficient 220 between a pattern of load distribution 208 for the session 210 and the usage 214 of at least one server 260 for a range of time 226. In embodiments, the device 202 can determine the correlation coefficient 220 using the covariance 224 determined between the same pattern of load distribution 208 for the session 210 and the same usage 214 of the server 260. The correlation coefficient 220 can include or represent a numerical measure of a statistical relationship (e.g., correlation) between two variables, here between the forecasted load (pattern of load distribution 208) for a session 210 and the forecasted load (e.g., usage 214, accumulated distribution pattern 216) for a server 260. The device 202 can determine, using the covariance 224, a correlation coefficient 220 between a pattern of load distribution 208 for the session 210 and the usage 214 of at least one server 260 for a range of time 226 using the methods and equations described below with respect to (312) of method 300 of FIG. 3A.

The device 202 can generate a threshold value 222 to determine whether the correlation coefficient 220 indicates a server 260 is a complementary server 260 or non-complementary server 260. The threshold value 222 can include or correspond to a minimum value to accept the respective server 260 as a match to host the session 210. In one embodiments, the threshold value 222 can be set at zero and the device 202 can determine if the correlation coefficient 220 is a positive value or a negative value. The device 202 can compare the correlation coefficient 220 to the threshold value 222 to determine if the correlation coefficient 220 is greater than or less than the threshold value 222. The threshold value 222 can include a number, a range of numbers, a percentage, a range of percentages, a value, and/or a range of values.

The device 202 can determine a total load 230 for a server 260. The total load 230 can include or correspond to a forecasted total load on a server if the server 260 is assigned a new session 210. For example, the total load 230 can include the pattern of load distribution 208 for a new session 210 (e.g., not yet assigned session) combined or summed with the usage 214 for the respective server 260 to provide a forecasted or predicted total load on the server 260 if new session 210 is assigned to the server 260. In embodiments, the device 202 can combine or add the pattern of load distribution 208 for the new session 210 with the patterns of load distribution 208 for one or more existing or active sessions 210 of the server 260 to determine a total load 230 (e.g., total session load) at a plurality of sampling points (e.g., individual time points) for a specified range of time 226 and determine if the server 260 may exceed a load threshold 232 at any point during the range of time 226.

The load threshold 232 can be indicative of or represent a maximum allowable load for a server 260 or an overload limit for a server 260. For example, if the total load 230 on a server 260 exceeds or is greater than the load threshold 232 during one or more points for a range of time 226, the server 260 may be overloaded at the one or more points and experience degradation in performance. The device 202 can determine or select the load threshold 232 based in part on properties of a client device 250, one or more sessions 210, a server 260, and/or the computing environment 200. The load threshold value 232 can include a number, a range of numbers, a percentage, a range of percentages, a value, and/or a range of values.

The device 202 can generate a moving average filter 240 and a weighted coefficient 242. The moving average filter 240 can include, but not limited to, a first order infinite impulse response filter or an exponentially weighted moving average (EWMA). The weighted coefficient 242 can include or correspond to a bias correction (e.g., cold start bias) for an initial period for a session 210. For example, the moving average filter 240 can apply one or more weights (e.g., weighted coefficient 242) to load index values 218 which decrease exponentially such that the weight for an older or previous load index value 218 can decrease exponentially, never reaching zero. The device 202 can apply the moving average filter 240 to one or more load index values 218 for a session 210 to generate a pattern of load distribution 208 for the session. The value in a pattern of load distribution 208 can be indicative of a moving average between a load index value 218 and one or more previous load index values 218.

The weighted coefficient 242 can be used to perform load forecasting for new sessions or new users having no previous values or limited previous values to use to predict future load index values 218 (e.g., cold start phase). A cold start phase, as used herein, can represent or correspond to an initial period of starting or activating a session 210 (e.g., first time user) not having enough data samples or limited amount of data samples to perform forecasting. The device 202 can generate a weighted coefficient 242 to represent a cold start phase applied to load index values 218 to perform forecasting for an initial session 210 and determine a pattern of load distribution 208 for the respective session. In embodiments, the weighted coefficient 242 (e.g., cold start bias) can include or correspond to a monotone increasing function to daily select different coefficient starting from, for example but not limited to, 0.5 for a bias correction in a cold start phase. The weighted coefficient 242 (e.g., cold start phase bias) can vary and can be selected based at least in part on the session 210, the user of the session 210 and one or more servers 260 to host the respective session 210. The device 202 can apply the moving average filter 240 and weighted coefficient 242 using the methods and equations described below with respect to (306) of method 300 of FIG. 3A.

Server 260 can include or deployed as, and/or be executed on any type and form of computing device, such as any desktop computer, laptop computer, or mobile device capable of communication over at least one network and performing the operations described herein. For example, servers 260 can include or correspond to one computer, a plurality of computers, or a network of distributed computers such as computer 100 shown in FIG. 1A. In embodiments, servers 260 can executes one or more applications on behalf of one or more of client devices 250 (e.g., as an application server), although other uses are possible, such as a file server, gateway server, proxy server, or other similar server uses. Client devices 250 may seek access or to establish a session 210 to a hosted application on a server 260. For example, a client device 250 can generate a request 252 to establish a session 210 to at least one server 260 for an application or resource provided by the server 260. The request 252 can identify or indicate an application, resource and/or client device 250 transmitting the request 252.

The applications can include resources, desktops, and or files. In embodiments, the applications can include native applications (e.g., native or local to a client device 250, local to a client device 250), hosted applications (e.g., virtual applications, virtual desktops), Software as a Service (SaaS) applications, virtual desktops, virtual applications, web applications, mobile applications, and other forms of content. In some embodiments, the applications can include or correspond to applications provided by remote servers or third party servers.

The client device 250 can include, but not limited to a computing device or a mobile device. The client device 250 can include or correspond to an instance of any client device, mobile device or computer device described herein. For example, the client device 250 can be the same as or substantially similar to computer 100 of FIG. 1A. The client device 250 can couple with the device 202 to establish one or more sessions 210 to one or more servers 260. In embodiments, the client device 250 can execute or run a client application, for example, provided by device 202 to provide access to a server 260 or to enable access to an application or resource provided by a server 260. For example, the client application can execute or run within a browser (e.g., embedded browser) of the client device 250.

The sessions 210 can include a channel, connection or session between a client device 250 and the device 202, between the device 202 and a server 260 and/or between a client device 250 and a server 260. The sessions 210 can correspond to or be used to establish an application session (e.g., virtual application), an execution session, a desktop session, a hosted desktop session, a terminal services session, a browser session, a remote desktop session, a URL session and/or a remote application session. The session 210 may include encrypted and/or secure sessions established between the device 202 and a client device 250. For example, a session 210 may include an encrypted session and/or a secure session established between the device 202 and a client device 250. The encrypted session 210 can include an encrypted file, encrypted data or traffic transmitted between the device 202 and a client device 250.

The above-mentioned elements or entities may be implemented in hardware, or a combination of hardware and software, in one or more embodiments. Components of the device 202 may be implemented using hardware or a combination of hardware or software detailed above in connection with FIGS. 1A-1B. For instance, these elements or entities can include any application, program, library, script, task, service, process or any type and form of executable instructions executing on hardware of a device (e.g., device 202). The hardware includes circuitry such as one or more processors in one or more embodiments.

Figure 3A:
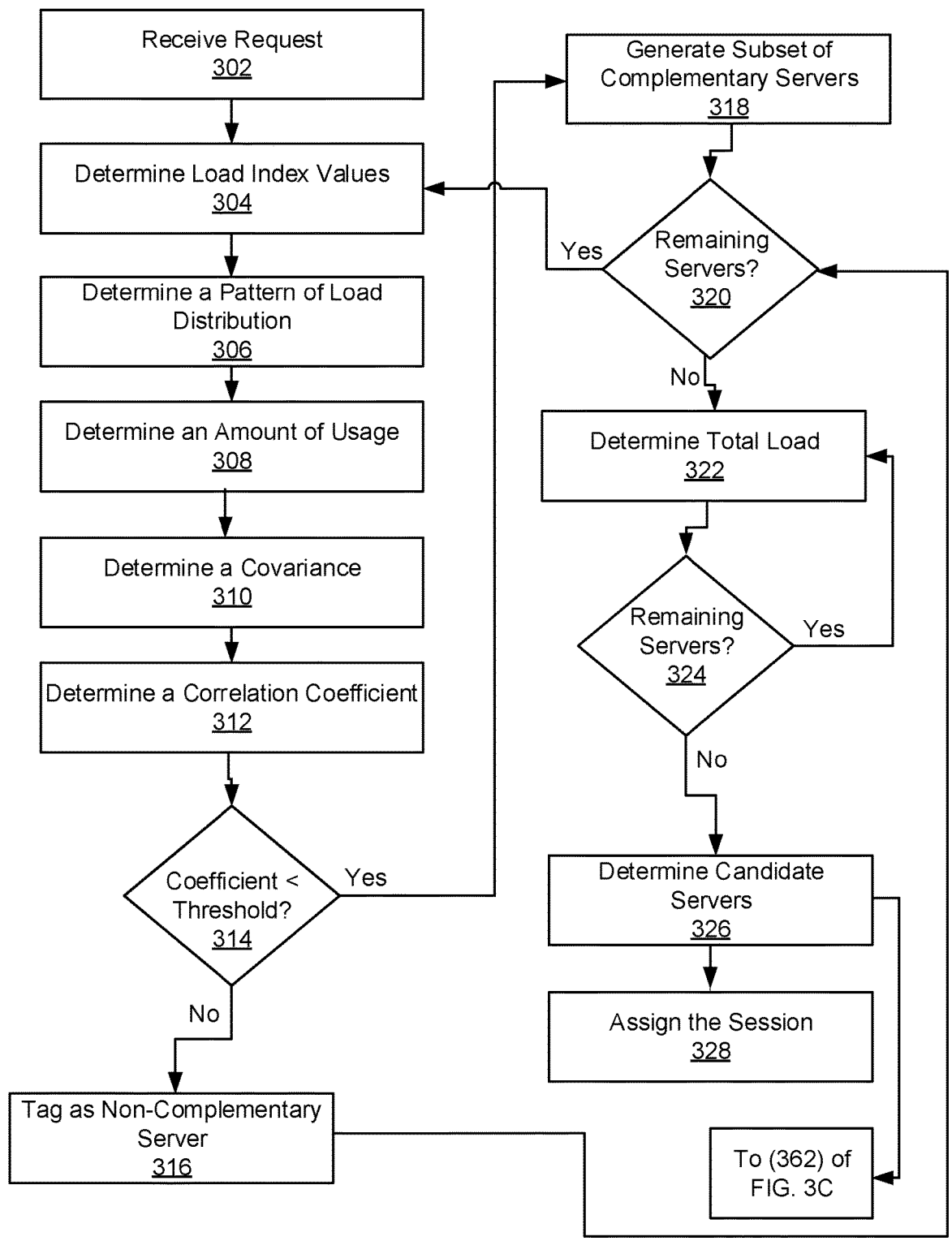
FIG. 3A is a flow diagram of a method for balancing user sessions using load pattern forecasting.

Referring now to FIG. 3A, depicted is a flow diagram of one embodiment of a method 300 for selecting a version of an application. In brief overview, the method 300 can include one or more of: receiving a request (302), determining load index values (304), determining a pattern of load distribution (306), determining an amount of usage (308), determining a covariance (310), determining a correlation coefficient (312), determining if a correlation coefficient is greater than or less than a threshold (314), generating a subset of complementary servers (316), generating a subset of non-complementary servers (318), determining whether there are any remaining servers (320), determining a total load (322), determining whether there are any remaining servers (324), determining the number of candidate servers (326), and assigning the session to a server (328). The functionalities of the method 300 may be implemented using, or performed by, the components detailed herein in connection with FIGS. 1A-2.

Referring now to operation (302), and in some embodiments, a request to establish a session can be received. A device 202 can receive a request 252 from a client device 250 to establish a session 210 to at least one server 260 of a plurality of servers 260. The device 202 can include an intermediary device between a plurality of client devices 250 and a plurality of servers 260 and establish, manage and balance a plurality of sessions 210 (e.g., user sessions) between the client devices 250 and the servers 260. The request 252 can include can include an identifier for the client device 250, a user of the client device 250 (e.g., credentials, login information), an application or resource to access. The session 210 can include a user session for the client device 250 to access an application or resource provided by one or more servers 260.

Referring now to operation (304), and in some embodiments, load index values can be determined. The device 202 can determine load index values 218 for a new session 210 (e.g., not yet assigned session) and/or existing sessions 210 of a server 260. The load index value 218 can be indicative of a point (e.g., forecasted point) within a window for the session 210. The window can include a period of time in which to identify usage of the server 260. In embodiments, the device 202 can use or sample load index values 218 for one or more previous sessions 210 from the same client device 250, the same user, a similar user type to the client device 250 or user that submitted the request 252 (e.g., same job level, same security clearance) or a combination of one or more previous sessions 210 from the same client device 250, the same user, and the similar user type. The load index values 218 can include or correspond to sample points within a sampling period of the sessions 210. In some embodiments, the sampling period can include, but not limited to, a few days, a few weeks or a few months. The sampling period can vary within or outside these time ranges and be selected based in part on the respective session 210, the client device 250, and/or user of the client device 250. The load index values 218 can include, but not limited to, a determined load index at a particular point in time or over a particular time intervals (e.g., 10 minute intervals, 1 hour intervals) within a sampling period. In embodiments, the load index value 218 can correspond to a measurement of resources uses (e.g., central processing unit (CPU) utilization, memory usage, disk I/O, context switches, page faults, page swaps) by the session 210 at determined intervals (e.g., every 10 minutes, every hour) over a determined sampling period (e.g., 24 hour period, week long period).

The load index value 218 can include or correspond to a measurement of how many resources a session 210 occupies at the sampling point in the sampling period (e.g., specific time in a calendar day). The load index value 218 can range from a minimum level (e.g., a 0 value representing no load) to a maximum level (e.g., a 10,000 value representing full load). The load index value 218 can vary within or outside this range. The device 202 can use one or more factors to determine the load index value 218 for a session 210, including but not limited to, CPU utilization, memory usage, disk I/O, context switches, page faults, and page swaps. The device 202 can determine a load index value 218 for a session 210. In some embodiments, this determination can include an exponentially weighted moving averages. The device 202 can provide one or more of the factors (e.g., CPU utilization and memory usage), a sampling interval and a sampling period to determine the load index value 218 for sampling intervals over the sampling period for the session 210.

Referring now to operation (306), and in some embodiments, a pattern of load distribution can be determined. The device 202 can determine a pattern of load distribution 208 for a session 210 prior to establishment of the session 210 on a server 260 of a computing environment 200. The device 202 can determine one or more patterns of load distribution 208 for one or more existing sessions 210 on a server 260 of a computing environment 200. The pattern 208 can be indicative of load on a server 260 to run the session 210 for a range of time 226. In embodiments, the device 202 can determine a pattern of load distribution 208 for the at least one session 210 based on the determined load index value 218. For example, the device 202 can store the load index values 218 for one or more sampling periods for a session 210 in database (e.g., storage device 206). The device 202 can use the load index values 218 from one or more sessions 210 to forecast or predict future session load index values 218 and generate a pattern of load distribution 208 for a new or subsequent session 210. For example, the device 202 can use the load index values 218 from the sessions 210 to generate a baseline pattern, sample pattern of load distribution 208 and forecast a pattern of load distribution 208 for the client device 250 for a similar period (e.g., similar time frame, similar days of the week as the sessions 210) for future or subsequent sessions 210 of the client device 250. The device 202 can determine a pattern of load distribution 208 for one or more existing or active sessions 210 of a server 260 to forecast or predict a future load pattern of the respective sessions 210 of the server 260. For example, in some embodiments, the device 202 can determine a pattern of load distribution 208 for existing sessions of a server 260.

In embodiments, the device 202 can determine the pattern of load distribution 208 for a session 210. The techniques for determination of the pattern of load distribution 208 can include, but not limited to, use of a moving average filter 240 or a first order infinite impulse response filter that applies one or more weighted coefficient 242 to data points (e.g., load index values) which decrease exponentially. For example, the weighted coefficient 242 applied to an older or previous data point (e.g., older or previous load index value) can decrease exponentially. In some embodiments, the device 202 can apply a moving average filter 240 to one or more load index values 218 for a session 210 to generate the pattern of load distribution 208 for the session. The value in a pattern of load distribution 208 can be indicative of a moving average between a load index value 218 and one or more load index values 218. The device 202 can apply the weighted coefficient 242 to the moving average filter 240. The weighted coefficient 242 can represent a bias correction for an initial period for the respective session 210. The equation for the load can include or be represented using the following equations:

$$\beta = \frac{1+T}{\alpha} - T \qquad (1)$$

$$\theta = \min\left\{\alpha, \frac{1+c}{\beta+c}\right\} \qquad (2)$$

$$Y_n = \theta Y_{n-1} + (1-\theta) X_n \qquad (3)$$

Where "T" represents a number of days in a cold start phase. "C" represents a number of days since a first day, an initial day or day one. "α" represents a degree of weighting decreases after a cold started phase. "β" represents a regulation factor for weighting decay in a cold start phase. "θ" represents a max value between α and β. "$X_n$" represents a value at a time period n, access frequency of a subsequent application (or resource, service) for a range of time (e.g., one day). "$Y_n$" represents a value of a determination of load at any time period n. "n" represents a time index (e.g., day index) in a sequence starting from a first day, an initial day, or initial value (e.g., 1).

Using equation 3 one can determine a value of the moving average 240 (Y) at a particular time "n" (e.g., a particular day "n") that is a combination or mix between a value of a raw signal between an initial signal or raw signal (X) at the particular time "n" and one or more previous values of the moving average itself. The device 202 can control the degree of mixing using the hyper parameter "θ" in a determined range (e.g., range of [0,1]). In embodiments, "θ" greater than a threshold value (e.g., large value) can be an indication that a majority of the contribution to the moving average (Y) is from one or more previous values before the current time point (e.g., current time, current day). In embodiments, θ less than the threshold value (e.g., lower value can indicate that a majority of the contribution to the moving average (Y) is from a more recent value with respect to the current time point and that the determination of load is more sensitive to the recent values or current values. The device 202 can determine individual values (e.g., Yn values) for the session 210 at each of the sampling points over a specified range of time 226 and generate the pattern of load distribution 208. For example, the device 202 can forecast sampling points for the range of time 226 techniques described herein and the pattern of load distribution 208 can include or be generated using the plurality of sampling points for the range of time 226.

A cold start phase, as used herein, can represent or correspond to an initial period of starting or activating a session 210 (e.g., first time session, initial session) not having any data samples or enough data samples, or having limited data samples to perform accurate forecasting. A cold start phase bias can be applied to perform forecasting for the initial session 210 and determine a load distribution pattern 208 for the respective session. The cold start bias can include or correspond to a monotone increasing function (e.g., non-decreasing in value over time) to daily select different coefficient starting from, for example but not limited to, 0.5 for a bias correction in a cold start phase. For example, the cold start bias can include or correspond to a monotone increasing function as the value of the cold start bias increases over a define time period and does not decrease in value. In embodiments, the coefficient "θ" can be set to a constant coefficient "α" after a cold start phase to include or incorporate the degree of weighting applied to the cold start bias after an initial time period or after the cold start phase.

The coefficient "θ" can be selected to generate or build a smoothing value corresponding to one or more similar sessions 210 and align the load distribution pattern 208 forecasted for the session 210 with the one or more similar sessions 210. For example, the device 202 can determine a value for the coefficient "θ" using previous values for one or more other sessions 210. The other sessions 210 can include previous sessions 210 for the same user, one or more sessions 210 from the same client device 250 and/or one or more sessions 210 from a similar or same user type (e.g., same level employee, same job title). In embodiments, as more data samples are received, the device 202 can update or modify the value of the coefficient θ and an accuracy of the load distribution pattern 208 can increase. The device 202 can use the additional data samples to increase the sample size and generate a more accurate or improved estimate of the coefficient θ. The device 202 can use the increased sample size to filter out or reduce an impact of random fluctuations CPU utilization and/or random spikes (e.g., one-time events) in CPU utilization that may alter the value of the coefficient θ and generate an inaccurate load distribution pattern 208. The device 202 can continually update the value of the coefficient θ as additional data samples are obtained.

Referring now to operation (308), and in some embodiments, an amount of usage for a server can be determined. The device can determine an amount of usage 214 of the plurality of servers 260 on a per server basis. The usage 214 (e.g., accumulated distribution pattern, accumulated forecast value) can be indicative of or represent sessions 210 to run on the individual servers 260 of the computing environment 200 for the range of time 226. In embodiments, the usage 214 of a server 260 can include or correspond to a summation or combination of load distribution patterns 208 for active, current or existing sessions 210 on the respective server 260. The device 202 can execute a usage equation (e.g., equation 4) to determine the usage 214 or accumulated distribution pattern 216 for an individual server 260. The usage equation can be represented as follows:

$$SL_{ij} = \Sigma_{k=1}^{n} L_{kj} \qquad (4)$$

Where "$SL_{ij}$" represents an accumulated load index in the $i^{th}$ server at the $j^{th}$ sampling point. "$L_{kj}$" represents a forecast load index of the $K^{th}$ session at the $j^{th}$ sampling point. "n" represents a number of session in the $i^{th}$ server (e.g., active sessions, existing sessions). The device 202 can determine the usage 214 for servers 260 individually, for example, for servers 260 in a server farm or a plurality of servers 260 connected to the device 202 in a computing environment 200. The device 202 can execute the usage equation to determine individual values (e.g., $SL_{ij}$ values) for the server 260 at the sampling points over a specified range of time 226 and generate the accumulated distribution pattern 216.

Referring now to operation (310), and in some embodiments, a covariance can be determined. The covariance 224 can provide a linear relationship between the pattern of load distribution 208 for the session 210 and the usage 214 of the server 260 for the range of time 226 to determine if the patterns are moving together and have a similar or same usage profile. The covariance 224 can provide a linear relationship between the pattern of load distribution 208 for the session 210 and the usage 214 of the server 260 for the range of time 226 to determine if the patterns are moving in different directions and have a different usage profile. For example, if the pattern of load distribution 208 for the session 210 and the usage 214 of the server 260 having a similar usage profile can indicate that they will increase in value (e.g., increase in CPU utilization) at the same times and cause, for example, an overload condition on the server 260 if the server 260 was to host the respective session 210. The device 202 can determine a covariance 224 between the pattern of load distribution 208 for the session 210 and the usage 214 of at least one server 260 for the range of time 226. The covariance 224 can include or represent a measure of variability or difference between the pattern of load distribution 208 for the session 210 and the usage 214 of the server 260 for the range of time 226. The range of time 226 can include a time period from a selected start time and a selected end time. The start time or beginning of the range of time 226 can be selected to correspond to the session launch time (e.g., when session 210 is activated or initiated). The end time or the end of the range of time 226 can be selected to correspond to a first sampling point or load index value 218 having a zero load value (e.g., no load, when forecasted load for session drops to zero) for the forecasted pattern of load distribution 208 of the session 210 and/or the usage 214 of the server 260 (e.g., when forecasted load on server drops to zero). In embodiments, the range of time 226 can be determined to correspond to or represent a period of time from when the new session 210 launches to a point in time when the load on the session 210 and/or at least one server 260 is forecasted to reach zero. The covariance 224 can be determined using the following equations:

$$u_k = \frac{\sum_{j=m}^{n} L_{kj}}{n - m} \quad (5)$$

$$v_i = \frac{\sum_{j=m}^{n} SL_{ij}}{n - m} \quad (6)$$

$$\text{cov}(L_k, SL_i) = \frac{\sum_{j=m}^{n} (L_{kj} - u_k)(SL_{ij} - v_i)}{n - m - 1} \quad (7)$$

Where "m" represents a start time for the range of time 226 and/or a number of a sampling point when a new session arrives, is requested or is initiated. "n" represents an end time for the range of time 226 and/or a number of a sampling point when the load on the session 210 and/or at least one server 260 is forecasted to reach zero. "uk" represents an average value of the kth session between the sampling point "m" and "n." "vi" represents an average value of the usage 214 (e.g., average value of the accumulated forecast load) for existing sessions 210 (e.g., all active sessions) of the $i^{th}$ server between the sampling point "m" and "n." "Cov(Lk, Ski)" represents the covariance 224 between the pattern for load distribution 208 (e.g., session forecast load) of the $k^{th}$ new session 210 and the usage 214 of existing sessions 210 of the $i^{th}$ server.

The device 202 can determine a covariance 224 between the pattern of load distribution 208 for the session 210 and the usage 214 of one or more servers 260 for the range of time 226. In embodiments, the device 202 can determine a covariance 224 between the pattern of load distribution 208 for the session 210 and the usage 214 of each server 260 of the plurality of servers 260 for the range of time 226 such that device 202 determines a covariance 224 for each server 260 individually. The covariance 224 can be used to determine a correlation coefficient 220 between the pattern of load distribution 208 for the session 210 and the usage 214 of one or more servers 260.

Referring now to operation (312), and in some embodiments, a correlation coefficient can be determined. The correlation coefficient 220 can provide a strength and a direction of a relationship between the pattern of load distribution 208 for the session 210 and the usage 214 of the server 260 for the range of time 226 to determine how strong or weak the relationship is between the two patterns. For example, a negative correlation coefficient 220 determined between the pattern of load distribution 208 for the session 210 and the usage 214 of the server 260 can indicate a weak relationship and that the pattern of load distribution 208 for the session 210 and the usage 214 of the server 260 increase and decrease at different times. A positive correlation coefficient 220 between the pattern of load distribution 208 for the session 210 and the usage 214 of the server 260 can indicate a strong relationship and that the pattern of load distribution 208 for the session 210 and the usage 214 of the server 260 increase at the same times and may cause, for example, an overload condition on the server 260 if the server 260 was to host the respective session 210. The device 202 can determine, using the covariance 224, a correlation coefficient 220 between the pattern of load distribution 208 for the session 210 and the usage 214 for the plurality of servers 260. In embodiments, the device 202 can determine, using the covariance 224, a correlation coefficient 220 between the pattern of load distribution 208 for the session 210 and the usage 214 of an individual server 260. The correlation coefficient 220 can include or represent a numerical measure of a statistical relationship (e.g., correlation) between two variables, here between the forecasted load (pattern of load distribution 208) on the new session 210 and the forecasted load (e.g., usage 214) on a server 260. The correlation coefficient 220 can be determined using the following formula:

$$r_{ik} = \frac{\text{cov}(L_k, SL_i)}{\sqrt{\text{Var}(L_k)\text{Var}(SL_i)}} \quad (8)$$

Where "$r_{ik}$" represents the correlation coefficient 220 between the $k^{th}$ new session 210 (e.g., pattern of load distribution 208 for the session) and the $i^{th}$ server (e.g., usage 214 of $i^{th}$ server). The device 202 can determine a correlation coefficient 220 between the pattern of load distribution 208 for the session 210 and the usage 214 of one or more servers 260 for the range of time 226. In embodiments, the device 202 can determine a correlation coefficient 220 between the pattern of load distribution 208 for the session 210 and the usage 214 of servers 260 of the plurality of servers 260 for the range of time 226 such that device 202 determines a correlation coefficient 220 for servers 260 individually.

Referring now to (314), and in some embodiments, the device can determine if the correlation coefficient is greater than or less than a threshold. The device 202 can determine if the correlation coefficient 220 is greater than or less than the threshold value 222 to determine the strength of the relationship between the pattern of load distribution 208 for the session 210 and the usage 214 of the server 260 and determine if the server 260 can support the session 210 without exceeding a load limit or CPU utilization limit of the respective server 260. The device 202 can compare the correlation coefficient 220 to a threshold value 222. The threshold value 222 can include or correspond to a minimum value to accept the respective server 260 as a match to host the session 210. In some embodiments, the threshold value 222 can be set at zero and the device 202 can determine if the correlation coefficient 220 is a positive value or a negative value. For example, a positive correlation coefficient 220 can indicate the new session 210 and the respective server 260 have a matching or similar forecasted load pattern or same load trend for the range of time 226. The positive correlation coefficient 220 can indicate that the pattern of load distribution 208 of the new session 210 has a similar or the same trend or same forecasted pattern of load distribution 208 as the active or existing sessions 210 of the respective server 260. For example, the pattern of load distribution 208 of the session 210 may increase at the same time intervals as when the forecasted patterns of load distribution 208 for the active or existing sessions 210 of the respective server 260 increase. In embodiments, having the same load trend or similar patterns of load distribution 208 can indicate that the new session 210 may cause an imbalance, overload condition and/or result in a degradation of the performance (e.g., reduced response time) of the server 260 if the new session 210 is assigned to the respective server 260. In embodiments, an overload condition can include, but not limited to, when the total load 230 of a server 260 exceeds a load threshold 232 (e.g., percentage of CPU utilization) for the respective server 260. For example, an overload condition can include or correspond to a time period or time point when a total resource usage (e.g., CPU utilization, memory usage) and/or demand on a server 260 exceeds a percentage (e.g., 80%, 90%) of a total usage limit of the respective server 260 and can result in the performance degradation (e.g., reduced response times) of the server 260 as the server 260 manages the increased demand and decreased resource availability.

A zero value or negative correlation coefficient 220 can indicate the new session 210 and the respective server 260 have a different forecasted load pattern for the range of time 226. The zero value or negative correlation coefficient 220 can indicate that the pattern of load distribution 208 of the new session 210 has a different trend or forecasted pattern of load distribution 208 as the active or existing sessions 210 of the respective server 260. For example, the pattern of load distribution 208 of the session 210 may increase when the forecasted patterns of load distribution 208 for the active or existing sessions 210 of the respective server 260 decrease and the pattern of load distribution 208 of the session 210 may decrease when the forecasted patterns of load distribution 208 for the active or existing sessions 210 of the respective server 260 increase. In embodiments, having a different load trend or patterns of load distribution 208 can indicate that the respective server 260 is a potential candidate server 260 or complimentary server 260 to host or be assigned the new session 210. If the correlation coefficient 220 is less than the threshold, the method 300 can move to (318). If the correlation coefficient 220 is greater than the threshold, the method 300 can move to (316).

Referring now to (316), and in some embodiments, the device can generate a listing or subset of servers having a correlation coefficient greater than the threshold. If the device 202 determines the correlation coefficient 220 for a server 260 is greater than the threshold 222, the device 202 can tag the respective server 260 as a non-complementary server 260. For example, the device 202 can generate a list of servers 260 or a subset of non-complementary servers 260 out of the plurality of servers 260 identified as being non-complimentary for the new session 210. The non-complementary servers 260 can include servers 260 identified as not being an appropriate match to host the new session 210 based in part on the forecasted patterns of load distribution for the new session 210 and the existing sessions 210 of the server 260.

Referring now to (318), and in some embodiments, the device can generate a listing or subset of servers having a correlation coefficient less than the threshold. The device 202 can determine that the correlation coefficient 220 of the selected server 260 is less than a threshold value 222, as previously explained above. If the device 202 determines the correlation coefficient 220 for a server 260 is less that the threshold 222, the device 202 can tag or otherwise identify the respective server 260 as a complementary server 260. A complementary server 260 can include a server 260 having a correlation coefficient 220 that is less than the threshold 222 and a server 260 having a different usage profile from the pattern of load distribution 208 of the session 210. For example, a complementary server 260 can include a server 260 having a negative correlation coefficient 220 and that the pattern of load distribution 208 for the session 210 and the usage 214 of the server 260 increase and decrease at different times. The device 202 can generate a list of servers 260 or a subset of complementary servers 260 out of the plurality of servers 260 identified as being complimentary for the new session 210.

Referring now to (320), and in some embodiments, the device can determine if there are any remaining servers. The device 202 can determine if there are any remaining servers 260 of the plurality of servers 260 to determine a usage 214, a covariance 224 and correlation coefficient 220. If there is one or more remaining servers 260, the method 300 can return to (304) to determine load index values 218 and a patterns of load distributions 208 for sessions 210 of a next server 260 or subsequent server 260 of the plurality of servers 260. The load index values 218 and a patterns of load distributions 208 for the sessions 210 of the next server 260 can be used to determine the usage 214 of the next server 260 of the plurality of servers 260. The device 202 can continue to determine the usage 214, the covariance 224 and correlation coefficient 220 for the plurality of servers 260 on a per server basis. In embodiments, the device 202 can determine a usage 214, a covariance 224 and a correlation coefficient 220 for servers 260 of the plurality of servers 260. In some embodiments, the device 202 can determine a usage 214, a covariance 224 and a correlation coefficient 220 for one or more servers 260 of the plurality of servers 260 until the device 202 identifies at least one server 260 or a determined number of servers 260 having a correlation coefficient 220 less than the threshold value (e.g., determined number of complimentary servers). If there are no more remaining servers 260, the method 300 can move to (322).

Referring now to (322), and in some embodiments, a total load 230 for a server 260 can be determined. The device 202 can determine a total lead for at least one server 260 or a total value of patterns of load distribution 208 for a plurality of session 210 of a server 260. The total load 230 can include the pattern of load distribution 208 for the session 210 combined with the usage 214 for the at least one server 260. For example, in some embodiments, the device 202 can combine the load distribution patterns 208 of the one or more sessions 210 to generate the total load 230 of the server 260 for a determined time period (e.g., range of time 226). The total load 230 can include a plurality of predicted load index values 218 for sessions 210 of the server 260 over the determined time period.

The device 202 can determine or forecast whether a total session load 230 of a server 260 may exceed a load threshold 232 if the respective server 260 is assigned the new session 210 for the range of time 226. The device 202 can combine or add the pattern of load distribution 208 for the session 210 with the patterns of load distribution 208 for the existing or active sessions 210 of the server 260 to determine a total session load 230 at a plurality of sampling points (e.g., each time point) for the range of time 226 and determine if the server 260 may exceed the load threshold 232 at any point during the range of time 226. In embodiments, the load threshold 232 can be used to identify an overload condition or degradation in the performance of a server 260 such that if the total load 230 on a server 260 exceeds the load threshold 232 the performance of the server 260 can suffer.

The load threshold 232 can vary and can be selected based in part on the session 210, the client device 250, and/or a user of the client device 250. In some embodiments, the device 202 can actively modify or tune the load threshold 232 for one or more servers 260 to monitor the computing environment 200 and/or rebalance load across the plurality of servers 260 of the computing environment 200. For example, the device 202 can reduce a load threshold 232 for a server 260 if the device 202 detects the respective server 260 is experiencing performance issues (e.g., slow response times, failures) prior the total load 230 of the server 260 reaching an existing load threshold 232. The device 202 can monitor and record response times by servers 260 to requests 252 to determine if a server 260 is experiencing performance issues. The device 202 can monitor connection failures or session failures to client devices 250 from one or more servers 260 to determine if a server 260 is experiencing performance issues. In some embodiments, responsive to a detected slow response time and/or session failure, the device 202 can determine the total load 230 of the respective server 260 and modify the load threshold 232 for the server 260 in view of the determined total load 230 at the time of the detected slow response time and/or session failure. In embodiments, the device 202 can modify the load threshold 232 for the server 260 to be a percentage (e.g., 80%, 90%) of determined total load 230 at the time of the detected slow response time and/or session failure. The device 202 can actively monitor the load on the plurality of servers 260 and actively monitor one or more load thresholds 232 for one or more servers 260 in response to a degradation of performance of the respective servers 260. The load threshold 232 can be tuned or otherwise adjusted (e.g., actively tuned or modified) for a server 260 in response to changes in the performance of the server 260.

The device 202 can determine if the total load 230 for the server 260 is greater than or less than the load threshold 232. If the total load 230 for the server 260 is greater than the load threshold 232, the device 202 can tag or otherwise identify the respective server 260 as a non-candidate server 260 or group the respective server 260 into a subset of non-candidate servers 260. If the total load 230 for the server 260 less than the load threshold 232, the device 202 can tag or otherwise identify the respective server 260 as a candidate server 260 or group the respective server 260 into a subset of candidate servers 260. In embodiments, the candidate servers 260 can be a subset of the complimentary servers 260 to further reduce or identify the most appropriate candidate servers 260 out of the complimentary servers 260 to host or assign the new session 210.

Referring now to (324), and in some embodiments, the device can determine if there are any remaining servers. The device 202 can determine if there are any remaining servers 260 of the plurality of servers 260 to determine a total load 230. The device 202 can continue to determine the total load 230 of servers 260 on a per server 260 basis until a total load 230 has been determined for each server 260 of the complementary servers 260. The device 202 can compare the number of remaining severs 260 to a threshold (e.g., zero) and when the number of remaining severs 260 to determine a total load 230 reaches the threshold (e.g., zero), the device 202 can determine there are no remaining servers 260 of the plurality of servers 260 to determine a total load 230. If there is one or more remaining servers 260, the method 300 can return to (322) to determine the total load 230 for the next server 260 of the remaining servers 260. The device 202 can continue to determine the total load 230 for the plurality of servers 260 on a per server basis. In embodiments, the device 202 can determine a total load 230 for servers 260 of the plurality of servers 260. In some embodiments, the device 202 can determine a total load 230 for one or more servers 260 of the plurality of servers 260 until the device 202 identifies at least one or a determined number of servers 260 having a total load 230 less than the load threshold 232 (e.g., determined number of candidate servers). If there are no more remaining servers 260 to determine a total load 230 for, the method 300 can move to (326).

Referring now to (326), and in some embodiments, the number of candidate servers 260 can be determined. The device 202 can determine if any candidate servers 260 were identified to assign the session 210 to or if multiple servers 260, how many. In some embodiments, the identification of possible candidate servers 260 in which to assign the session 210 can include servers 260 having a correlation coefficient 220 less than the threshold 222 (e.g., negative correlation coefficient) and a total load 230 less than the load threshold 232. If no candidate servers 260 were identified, the method 300 can move to (362) of method 360 of FIG. 3C to select a server 260 from the subset of non-complimentary servers 260. If one or more candidate servers 260 are identified the method 300 can move to (328).

Referring now to (328), and in some embodiments, the session can be assigned to a server in which to host the session. The device 202 can selected one of the plurality of servers 260 on which to run the session based on a comparison of the pattern of load distribution 208 for the session 210 and the determined amounts of usage 214 of the plurality servers 260. If a single candidate server 260 is identified, the device 202 can assign the new session 210 to the single candidate server 260. If multiple candidate servers 260 are identified, the device 202 can select at least one server 260 from the subset of candidate servers 260. For example, the device 202 can identify a subset of servers 260 (e.g., multiple candidate servers) from the multiple servers 260 with total loads 230 less than a load threshold value 232. The device 202 can determine the current or active load on the multiple candidate servers 260. In embodiments, the device 202 can assign the new session 210 to the server 260 of the multiple candidate servers 260 having the lowest or lightest current or active load. For example, the device 202 can compare the active loads of the multiple candidate servers 260 and assign the new session 210 to the selected server 260 responsive to determining that the total load 230 (e.g., total active load at time request for new session is received) of the selected server 260 is less than the being less than the total load 230 of the other servers 260 of the multiple candidate servers 260. The device 202 can assign a new session 210 to the server 260 based on the usage 214 and/or the generated accumulated distribution pattern 216 for the server 260 to establish the session 210 on the server 260. In embodiments, the device 202 can assign the session 210 to the selected server 260 of the computing environment 200 to balance resource usage across the computing environment 200.

Figure 3B:
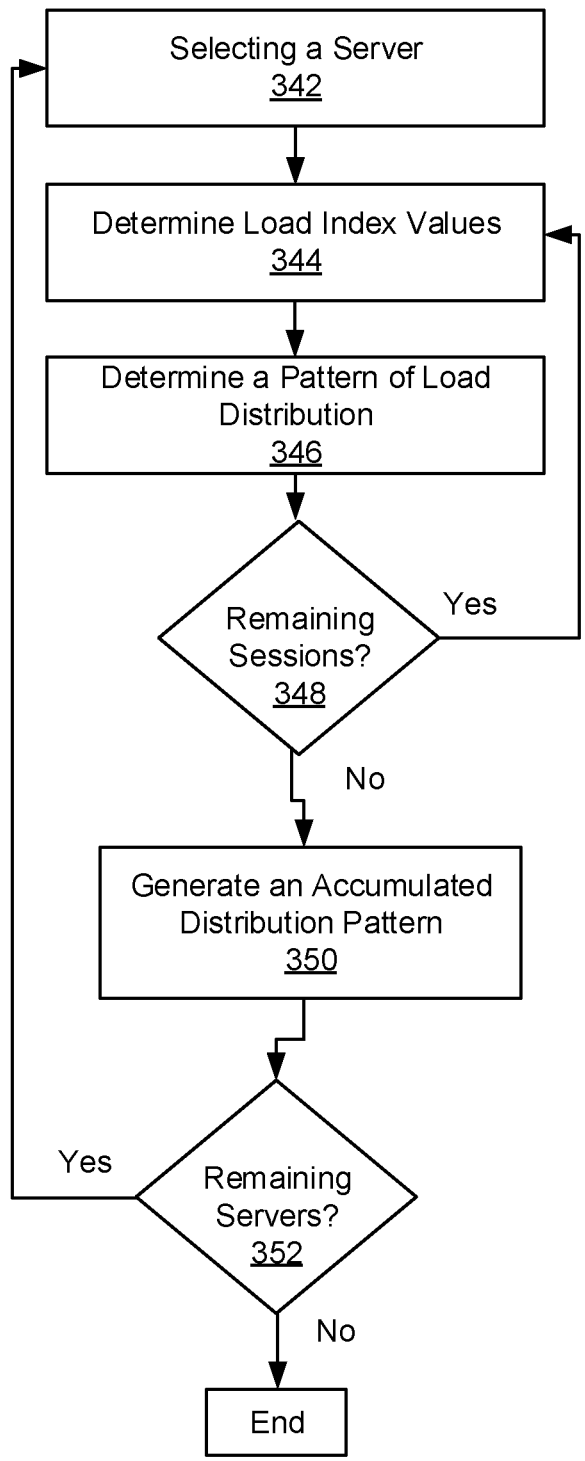
FIG. 3B is a flow diagram of a method for determining an amount of usage of a plurality of servers on a per server basis.

Referring now to FIG. 3B, depicted is a flow diagram of one embodiment of a method 340 for determining an amount of usage of a plurality of servers on a per server basis. In brief overview, the method 340 can include one or more of: selecting a server (342), determining a load index value for a session (344), determining a pattern of load distribution for the session (346), identifying any remaining sessions for the server (348), generating an accumulated distribution pattern for the server (350), and identifying any remaining servers (352). The functionalities of the method 340 may be implemented using, or performed by, the components detailed herein in connection with FIGS. 1A-2.

Referring now to operation (342), and in some embodiments, a server of a plurality of servers can be selected or a first server of the plurality of servers can be selected. A device 202 can manage and balance load (e.g., session load) across a plurality of servers 260 by forecasting or predicting load patterns for the servers 260. To forecast or predict an amount of usage 214 or accumulated distribution pattern 216 for a server 260, the device 202 can determine the pattern of load distribution for existing or active sessions 210 on the respective server 260. The device 202 can select a first server 260 of the plurality of servers 260 to determine an amount of usage 214 for the first server 260. The device 202 can select a first server 260 of the plurality of servers 260 in a sequential order or a random order on a per server basis until the device 202 has determined an amount of usage 214 for each server 260. In some embodiments, the device 202 can determine the amount of usage 214 for a server 260 based in part on a number of active or existing sessions 210 to the respective server 260. For example, the device can select the server 260 having the most active or existing sessions 210 to determine the amount of usage 214 first and select the remaining servers 260 in a descending order based on the number of active or existing sessions 210 to the respective server 260.

Referring now to operation (344), and in some embodiments, one or more load index values 218 can be determined for a session 210. The device 202 can determine the number of existing sessions 210 on the selected server 260 and select a first session 210 or at least one session 210. The device 202 can determine a load index value 218 for the first session 210 or at least one session 210 active on the selected server 260, as previously described herein. The load index value 218 can be indicative of a point within a window for the at least one session 210. The window can include or correspond to a range of time 226 or period of time in which to identify usage 214 of the selected server 260. The session 210 can include a previous session 210 from the same client device 250, the same user, and/or a similar user type (e.g., same job type). The load index values 218 can include or correspond to individual sample points within the window, such as but not limited to, individual time points within a range of time 226. The load index values 218 can include or correspond to a measurement of load and/or resource usage by the first session 210 at the respective sample point. In embodiments, the device 202 can determine one or more load index values 218 for the first session 210 during the time period indicated by the window.

Referring now to operation (346), and in some embodiments, a pattern of load distribution for the first session can be determined. The device 202 can determine a load distribution pattern 208 for the first session 210 or at least one session 210 based on the determined load index value 218. The device 202 can use the one or more load index values 218 determined for the session to generate or forecast a pattern of load distribution 208 for the server 260. The techniques for determination of the pattern of load distribution 208 can include, but not limited to, use of a moving average filter 240 or a first order infinite impulse response filter that applies one or more weighted coefficient 242 to data points (e.g., load index values) which decrease exponentially. The device 202 can apply a moving average filter 240 to one or more load index values 218 for a session 210 to generate the pattern of load distribution 208 for the session 210. The value in a pattern of load distribution 208 can be indicative of a moving average between a load index value 218 and one or more load index values 218. The device 202 can apply the weighted coefficient 242 to the moving average filter 240. The weighted coefficient 242 can represent a bias correction for an initial period for the respective session 210. In some embodiments, the device 202 can use machine learning or other analytical techniques to determine the load distribution pattern 208 for a session 210, for example, as described above with respect to (306) of method 300 of FIG. 3A.

Referring now to operation (348), and in some embodiments, the device can determine if any there are any remaining sessions of the server. The device 202 can determine if there are any remaining sessions 210 existing or active for the selected server 260 to determine one or more load index values 218 for and determine a pattern of load distribution 208. The device 202 can continue to determine load index values 218 and a pattern of load distribution 208 on a per server 260 basis until load index values 218 and a pattern of load distribution 208 has been determined for each server 260. The device 202 can compare the number of remaining severs 260 to a threshold (e.g., zero) and when the number of remaining severs 260 to determine load index values 218 and a pattern of load distribution 208 reaches the threshold (e.g., zero), the device 202 can determine there are no remaining servers 260 of the plurality of servers 260 to determine load index values 218 and a pattern of load distribution 208. If there is at least one remaining session, the method 300 can return to (344) to select a next or subsequent session 210 of the respective server 260 to determine one or more load index values 218 for and determine a pattern of load distribution 208 for the selected server 260. The device 202 can continue to determining load index values 218 and patterns of load distribution 208 on a per session basis until the device 202 has determined load index values 218 and a pattern of load distribution 208 for existing or active sessions 210 for the selected server 260. When there are no remaining sessions 210 for the selected server 260, the method can move to (350).

Referring now to operation (350), and in some embodiments, an accumulated distribution pattern can be generated for the selected server. The device 202 can generate an accumulated distribution pattern 216 for the selected server 260. The accumulated distribution pattern 216 can be indicative of a predicted or forecasted load pattern for the selected server 260. The device 202 can sum or combine the patterns of load distribution 208 for the existing or active sessions 210 of the selected server 260 to generate the accumulated distribution pattern 216. For example, the accumulated distribution pattern 216 can include or correspond to load pattern for the existing or active sessions 210 of the selected server 260 combined together to form a single load pattern. In some embodiments, the device 202 can determine the accumulated distribution pattern 216 for a server 260 using the usage equation (e.g., equation 4) described above with respect to (308) of method 300 of FIG. 3A.

Referring now to operation (352), and in some embodiments, a determination can be made if there are any remaining servers. The device 202 can determine if there are any remaining servers 260 of the plurality of servers 260 to determine an accumulated distribution pattern 216. If there is at least one remaining server 260, the method 300 can return to (342) to select a next or subsequent server 260 of the remaining plurality of servers 260 to generate an accumulated distribution pattern 216 on a per server basis. The device 202 can continue to generate accumulated distribution patterns 216 until the device 202 has generated an accumulated distribution pattern 216 for the servers 260 of the plurality of server 260.

Figure 3C:
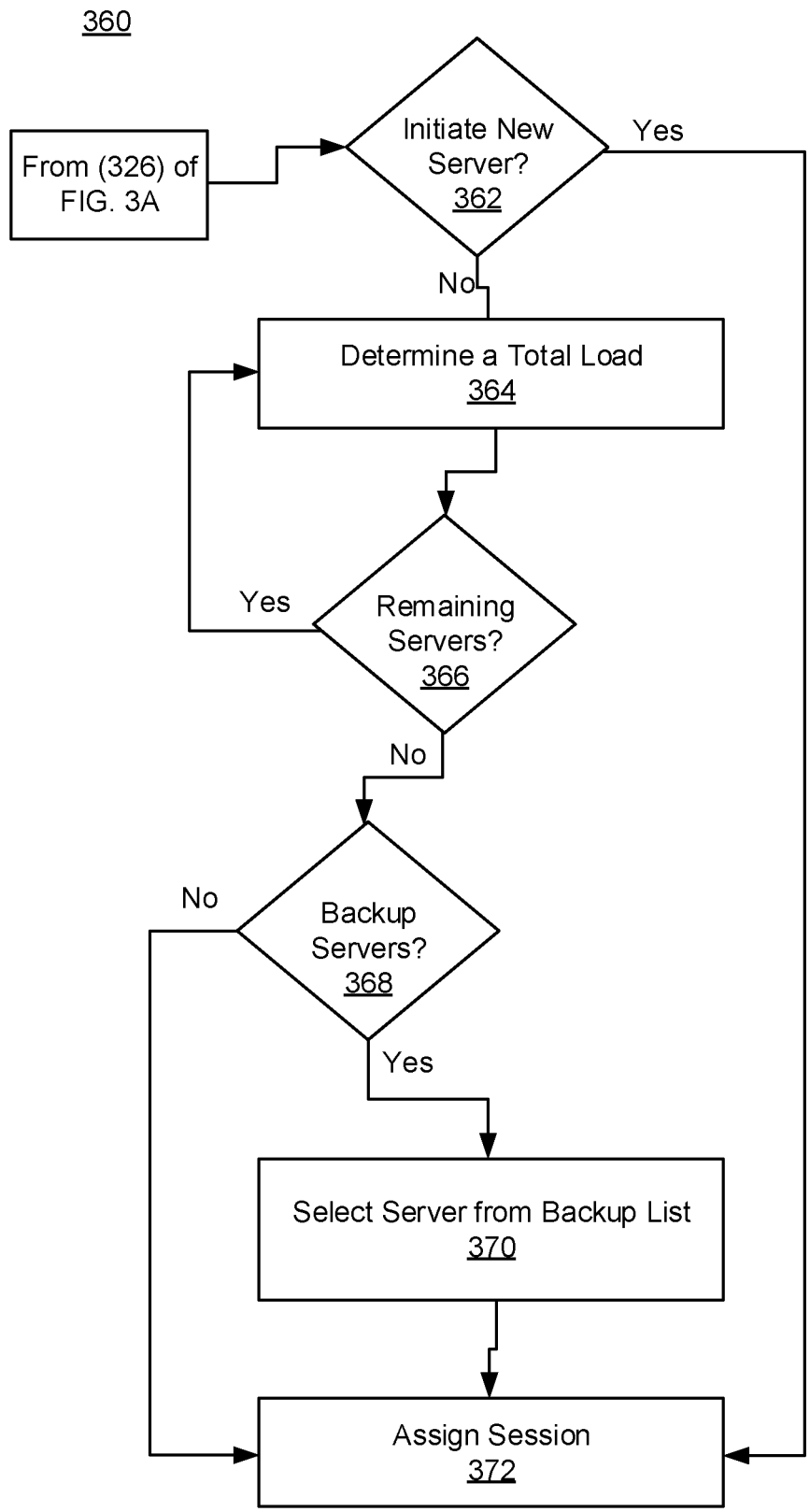
FIG. 3C is a flow diagram of a method for selecting a server from a subset of non-complementary servers.

Referring now to FIG. 3C, depicted is a flow diagram of one embodiment of a method 360 for selecting a server from a subset of non-complementary servers. In brief overview, the method 360 can include one or more of: determining whether or not to select a new server (362), determining a total load for a server (364), determining whether there are any remaining servers from the subset of non-complementary servers (366), determining whether there are any servers added to a backup server listing (368), selecting a server from the backup server listing (370), and assigning the session to a new server or reject session request (372). The functionalities of the method 360 may be implemented using, or performed by, the components detailed herein in connection with FIGS. 1A-2.

Referring now to (362), and in some embodiments, a determination can be made whether to select a new server for the session. In some embodiments, the device 202 can determine that existing or active servers 260 of the plurality of servers have a correlation coefficient 220 greater than the threshold 222 (e.g., positive correlation coefficient). The device 202 can determine that the existing or active servers 260 of the plurality of servers is tagged as or identified as being non-complementary servers 260 because their respective determined usage 214 matches or follows the forecasted pattern of load distribution 208 for the new session 210. Thus, the servers 260 may experience performance issues or degradation if the new session 210 was assigned to one of the servers 260, for example, due to overload conditions. The device 202 can make a determination of whether to initiate a new server 260 to host the session 210 or identify a next best server 260 out of the non-complementary servers 260. In some embodiments, the determination can be made based in part on a total number of active or existing servers 260 currently connected to the device 202, a total load in the computing environment of the plurality of servers 260 and/or an average load across the plurality of servers 260. If the device 202 determines to assign the session 210 to a new server 260, the method 380 can move to (372). If the device 202 determines to analyze the non-complementary servers 260, the method 300 can move to (364).

Referring now to (364), and in some embodiments, a total load can be determined for one or more existing sessions of a server. The device 202 can determine a total load 230 for a server 260 of the non-complementary servers 260. For example, the device 202 can execute method 340 of FIG. 3B to determine patterns of load distribution 208 for the existing or active sessions 210 on the respective server. The device 202 can determine a pattern of load distribution 208 for one or more sessions 210 active for the server 260 using one or more load index values 218 for the respective sessions 210. In embodiments, the device 202 can provide the load index values 218 for a session 210 to determine the pattern of load distribution 208 for the respective session 210. The device 202 can combine or sum the patterns of load distribution 208 for the existing sessions on a server 260 to generate an accumulated distribution pattern 216 for the server 260. The pattern of load distribution 208 forecasted for the new session 210 can be combined with or added to the accumulated distribution pattern 216 for the server 260 to determine a total load 230 for the respective server 260.

The total load 230 for the server 260 can be compared to a load threshold 232 to identify if the server 260 may experience an overload condition during a particular range of time 226. As stated above, an overload condition can include, but not limited to, when the total load 230 of a server 260 exceeds the load threshold 232 for the respective server 260. The overload condition can include or correspond to a time period or time point when a total resource usage (e.g., CPU utilization, memory usage) and/or demand on a server 260 exceeds the load threshold 232 and can result in the performance degradation (e.g., reduced response times) of the server 260 respective server 260. In embodiments, the load threshold 232 of method 340 can be the same as the load threshold 232 of method 300. In some embodiments, the load threshold 232 of method 340 can be different from the load threshold 232 of method 300. For example, the device 202 can modify (e.g., increase, decrease) the load threshold 232 to identify at least one server from the non-complementary server 260 to assign the new session 210 and avoid an overload condition. If the total load 230 for the server 260 is greater than the load threshold 232, the device 202 can tag or otherwise identify the respective server 260 as ineligible to be assigned the new session 210 or remove the respective server 260 from the non-complementary server 260 listing. If the total load 230 for the server 260 less than the load threshold 232, the device 202 can tag or otherwise identify the respective server 260 as an eligible server 260 to be assigned the new session 260 or add the respective server 260 to a backup server listing. The backup server listing can include one or more non-complementary servers 260 having a total load 230 less than the load threshold 232. For example, the backup server listing can include a subset of the non-candidate servers 260 to further reduce or identify the most appropriate servers 260 out of the non-complementary servers 260 to host or assign the new session 210.

Referring now to (366), and in some embodiments, a determination can be made whether there are any remaining servers from the subset of non-complementary servers 260. The device 202 can determine if there are any remaining servers 260 of the non-complementary servers 260 to determine a total load 230. The device 202 can continue to determine the total load 230 on a per server 260 basis until a total load 230 has been determined for each server 260. The device 202 can compare the number of remaining severs 260 to a threshold (e.g., zero) and when the number of remaining severs 260 to determine a total load 230 reaches the threshold (e.g., zero), the device 202 can determine there are no remaining servers 260 of the plurality of servers 260 to determine the total load 230. If there is at least one remaining server 260, the method 300 can return to (364) to select a next or subsequent server 260 of the non-complementary servers 260. The device 202 can select the next server 260 of the remaining non-complementary servers 260 in a sequential order or a random order on a per server basis until the device 202 has determined a total load 230 for each server 260. In some embodiments, the device 202 can select the next server 260 of the remaining non-complementary servers 260 based in part on a number of active or existing sessions 210 to the respective server 260. For example, the device can select the next server 260 having the most active or existing sessions 210 to determine the total load 230 and select the remaining servers 260 in a descending order based on the number of active or existing sessions 210 to the respective server 260. A total load 230 for one or more existing sessions 210 of the server 260 can be determined as previously described herein. The device 202 can continue to determine a total load 230 for servers 260 until the device 202 has compared the total load 230 of the servers 260 of the non-complementary servers 260 to the load threshold 232.

Referring now to (368), and in some embodiments, a determination can be made whether any servers have been added to a backup server listing. The device 202 can determine how many servers 260 of the non-complementary servers 260 were tagged or otherwise identified as backup servers or included in the backup server listing. If there are one or more servers 260 included in the backup server listing, the method 300 can move to (370) to select a server 260 from the backup server listing. If there are no servers 260 included in the backup server listing, the method 300 can move to (372) to activate a new server 260.

Referring now to (370), and in some embodiments, a server can be selected from the backup server listing. The device 202 can select at least one server 260 from the backup server listing to assign the new session 210. If there is a single server 260 in the backup server listing, the device 202 can assign the new session 210 to the respective server 260. If there are multiple servers 260 in the backup server listing, the device 202 can assign the new session 210 to the server 260 having the lowest or smallest total load 230 as compared to the total load 230 values of the servers 260 in the backup server listing.

Referring now to (372), and in some embodiments, the session can be assigned to a new server or the session request can be rejected. The device 202 can determine that none of the non-complementary servers 260 have a total load 230 less than the load threshold 232 and determine to assign the session 210 to a new server 260 or reject the server request. The device 202 can make the determination based in part on a total number of active or existing servers 260 currently connected to the device 202, a total load in the computing environment of the plurality of servers 260 and/or an average load across the plurality of servers 260. In some embodiments, the device 202 can determine to reject the session 210 request, for example, when the total number of active or existing servers 260 currently connected to the device 202 reaches a server threshold, a total load in the computing environment of the plurality of servers 260 reaches a load threshold and/or an average load across the plurality of servers 260 reaches an average load threshold.

In embodiments, the device 202 can determine to initiate or active a new server 260 for the new session 210. The device 202 can activate the new server 260 in the computing environment and assign the new session 210 to the new server 260. In some embodiments, the device 202 can re-balance load in the computing environment responsive to activating the new server 260. For example, the device 202 can assign or shift one or more existing sessions 210 on one or more other servers 260 to the new server 260 to lower the load on the respective other servers 260.

The following paragraphs (M1) through (M10) describe examples of methods that may be implemented in accordance with the present disclosure.

(M1) A method implemented by a computing device comprising: determining a pattern of load distribution for a session prior to establishment of the session on a server of a computing environment, the pattern being indicative of load on a server to run the session for a range of time, and the computing environment including a plurality of servers on which to establish the session; determining an amount of usage of the plurality of servers on a per server basis, the usage being indicative of sessions to be run on individual servers of the computing environment for the range of time; selecting one of the plurality of servers on which to run the session based on a comparison of the pattern of load distribution for the session and the determined amounts of usage of the plurality servers; and assigning the session to the selected server of the computing environment to balance resource usage across the computing environment.

(M2) A method may be performed as described in paragraph (M1) further comprising determining a total value of patterns of load distribution for a plurality of sessions of the selected server.

(M3) A method may be performed as described in any of paragraphs (M1) and (M2) further comprising determining a correlation coefficient of the selected server is less than a threshold value, the correlation coefficient indicative of a relationship between the pattern of load distribution for the session and a total value of patterns of load distribution for a plurality of sessions of the selected server.

(M4) A method may be performed as described in any of paragraphs (M1)-(M3) further comprising determining a plurality of load index values for one or more previous sessions over a determined interval; and determining the pattern of load distribution for the session using the plurality of load index values.

(M5) A method may be performed as described in any of paragraphs (M1)-(M4) further comprising determining a plurality of load index values for individual sessions active on the plurality of servers; and determining, using the plurality of load index values, the pattern of load distribution for individual sessions active on the plurality of servers.

(M6) A method may be performed as described in any of paragraphs (M1)-(M5) further comprising determining a covariance between the pattern of load distribution for the session and the usage for at least one server for the range of time.

(M7) A method may be performed as described in any of paragraphs (M1)-(M6) further comprising determining, using the covariance, the correlation coefficient between the pattern of load distribution for the session and the usage for the plurality of servers.

(M8) A method may be performed as described in any of paragraphs (M1)-(M7) further comprising identifying multiple servers from the plurality of servers having a correlation coefficient less than a threshold value.

(M9) A method may be performed as described in any of paragraphs (M1)-(M8) further comprising determining a total load for at least one server, the total load including the pattern of load distribution pattern for the session combined with the usage for the at least one server.

(M10) A method may be performed as described in any of paragraphs (M1)-(M9) further comprising identifying a subset of servers from the multiple servers with total loads less than a load threshold value, the subset of servers including the selected server; and assigning the session to the selected server responsive to the total load of the selected server being less than the load threshold value.

The following paragraphs (M11) through (M14) describe examples of methods that may be implemented in accordance with the present disclosure.

(M11) A method implemented by a computing device comprising: determining a load index value for at least one session active on a server, the load index value indicative of a point within a window for the at least one session, the window being a period of time in which to identify usage of the server; determining a load distribution pattern for the at least one session based on the determined load index value; generating an accumulated distribution pattern for the server, the accumulated distribution pattern indicative of a predicted load pattern for the server; and assigning a new session to the server based on the generated accumulated distribution pattern for the server to establish the session on the server.

(M12) A method may be performed as described in paragraph (M11) further comprising applying a moving average filter to the load index value for at least one session to generate the load distribution pattern of the at least one session, the value in a load distribution pattern indicative of a moving average between the load index value and one or more previous load index values.

(M13) A method may be performed as described in any of paragraphs (M11)-(M12) further comprising applying a weighted coefficient to the moving average filter, the weighted coefficient representing a bias correction for an initial period for the respective session.

(M14) A method may be performed as described in any of paragraphs (M11)-(M13) further comprising combining the load distribution patterns of the one or more sessions to generate the accumulated distribution pattern of the server for a determined time period, the accumulated distribution pattern including a plurality of predicted load index values for the server over the determined time period.

The following paragraphs (S1) through (S6) describe examples of devices that may be implemented in accordance with the present disclosure.

(S1) A system comprising: one or more processors coupled to memory, the one or more processors configured to: determine a pattern of load distribution for a session prior to establishment of the session on a server of a computing environment, the pattern being indicative of load on a server to run the session for a range of time, and the computing environment including a plurality of servers on which to establish the session; determine an amount of usage of the plurality of servers on a per server basis, the usage being indicative of sessions to be run on individual servers of the computing environment for the range of time; select one of the plurality of servers on which to run the session based on a comparison of the pattern of load distribution for the session and the determined amounts of usage of the plurality servers; and assign the session to the selected server of the computing environment to balance resource usage across the computing environment.

(S2) A system as described in paragraph (S1) wherein the one or more processors are further configured to: determine a total value of patterns of load distribution for a plurality of sessions of the server.

(S3) A system as described in any of paragraphs (S1)-(S2) wherein the one or more processors are configured to: determine a correlation coefficient of the selected server is less than a threshold value, the correlation coefficient indicative of a relationship between the pattern of load distribution for the selected session and a total value of patterns of load distribution for a plurality of sessions of the server.

(S4) A system as described in any of paragraphs (S1)-(S3) wherein the one or more processors are configured to: determine a plurality of load index values for one or more previous sessions over a determined interval; and determine the pattern of load distribution for the session using the plurality of load index values.

(S5) A system as described in any of paragraphs (S1)-(S4) wherein the one or more processors are configured to: determine a covariance between the pattern load distribution for the session and the usage for at least one server for the range of time.

(S6) A system as described in any of paragraphs (S1)-(S5) wherein the one or more processors are configured to: determine, using the covariance, the correlation coefficient between the pattern of load distribution for the session and the usage for the plurality of servers.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method implemented by a computing device comprising:
    determining, by one or more processors prior to establishment of a session on a server of a computing environment, a pattern of load distribution for the session that indicates a load on a server to run the session for a range of time, the computing environment including a plurality of servers on which to establish the session;
    determining, by the one or more processors, a coefficient indicative of a relationship between the pattern of load distribution for the session and a total value of patterns of load distribution for a plurality of sessions to be run on one of the plurality of servers of the computing environment for the range of time;
    selecting, by the one or more processors, the one of the plurality of servers on which to run the session based at least in part on the coefficient being less than a threshold value; and
    assigning, by the one or more processors, the session to the selected server of the computing environment to balance resource usage across the computing environment.

2. The method of claim 1, comprising:
    determining a total value of patterns of load distribution for the plurality of sessions of the selected server.

3. The method of claim 1, wherein the coefficient comprises a correlation coefficient.

4. The method of claim 1, comprising:
determining a plurality of load index values for one or more previous sessions over a determined interval; and
determining the pattern of load distribution for the session using the plurality of load index values.

5. The method of claim 1, comprising:
determining a plurality of load index values for individual sessions active on the plurality of servers; and
determining, using the plurality of load index values, the pattern of load distribution for individual sessions active on the plurality of servers.

6. The method of claim 1, comprising:
determining a covariance between the pattern of load distribution for the session and the usage for at least one server for the range of time.

7. The method of claim 6, wherein the coefficient comprises a correlation coefficient, comprising:
determining, using the covariance, the correlation coefficient between the pattern of load distribution for the session and the usage for the plurality of servers.

8. The method of claim 1, comprising:
identifying multiple servers from the plurality of servers having a correlation coefficient less than a threshold value.

9. The method of claim 8, comprising:
determining a total load for at least one server based on the pattern of load distribution for the session combined with a usage for the at least one server.

10. The method of claim 8, comprising:
identifying a subset of servers from the multiple servers with total loads less than a load threshold value, the subset of servers including the selected server; and
assigning the session to the selected server responsive to a total load of the selected server being less than the load threshold value.

11. A method implemented by a computing device comprising:
determining, by one or more processors, a load index value for at least one session active on a server, the load index value indicative of a point within a window for the at least one session, the window being a period of time in which to identify usage of the server;
determining, by the one or more processors, a load distribution pattern that indicates a load on a server to run the at least one session based on the determined load index value;
generating, by the one or more processors, an accumulated distribution pattern for the server, the accumulated distribution pattern indicative of a predicted load pattern for the server;
determining, by the one or more processors, a coefficient indicative of a relationship between the load distribution pattern for the at least one session and the accumulated distribution pattern for the server; and
assigning, by the one or more processors, a new session to the server based at least in part on the coefficient being less than a threshold to establish the session on the server.

12. The method of claim 11, comprising:
applying a moving average filter to the load index value for the at least one session to generate the load distribution pattern of the at least one session, the load index value indicative of a moving average between the load index value and one or more previous load index values.

13. The method of claim 12, comprising:
applying a weighted coefficient to the moving average filter, the weighted coefficient representing a bias correction for an initial period for the respective session.

14. The method of claim 11, comprising:
combining a plurality of load distribution patterns of the at least one session to generate the accumulated distribution pattern of the server for a determined time period, the accumulated distribution pattern including a plurality of predicted load index values for the server over the determined time period.

15. A system comprising:
one or more processors coupled to memory, the one or more processors configured to:
determine, prior to establishment of a session on a server, a pattern of load distribution for the session on the server of a computing environment that indicates a load on a server to run the session for a range of time, the computing environment including a plurality of servers on which to establish the session;
determine a coefficient indicative of a relationship between the pattern of load distribution for the session and a total value of patterns of load distribution for a plurality of sessions to be run on one of the plurality of servers of the computing environment for the range of time;
select one of the plurality of servers on which to run the session based at least in part on the coefficient being less than a threshold value; and
assign the session to the selected server of the computing environment to balance resource usage across the computing environment.

16. The system of claim 15, wherein the one or more processors are configured to:
determine a total value of patterns of load distribution for a plurality of sessions of the server.

17. The system of claim 15, wherein the coefficient comprises a correlation coefficient.

18. The system of claim 15, wherein the one or more processors are configured to:
determine a plurality of load index values for one or more previous sessions over a determined interval; and
determine the pattern of load distribution for the session using the plurality of load index values.

19. The system of claim 15, wherein the one or more processors are configured to:
determine a covariance between the pattern of load distribution for the session and the usage for at least one server for the range of time.

20. The system of claim 19, wherein the coefficient comprises a correlation coefficient, and the one or more processors are configured to:
determine, using the covariance, the correlation coefficient between the pattern of load distribution for the session and the usage for the plurality of servers.

* * * * *